(12) United States Patent
Seo et al.

(10) Patent No.: US 11,720,657 B2
(45) Date of Patent: Aug. 8, 2023

(54) ELECTRONIC DEVICE AND METHOD FOR ACTIVATING FINGERPRINT SENSOR

(71) Applicant: SAMSUNG ELECTRONICS CO., LTD., Suwon-si (KR)

(72) Inventors: Hyewon Seo, Suwon-si (KR); Chakyum Kim, Suwon-si (KR); Seungnyun Kim, Suwon-si (KR); Yongsang Yun, Suwon-si (KR); Seungeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 215 days.

(21) Appl. No.: 17/171,235

(22) Filed: Feb. 9, 2021

(65) Prior Publication Data

US 2021/0248347 A1 Aug. 12, 2021

(30) Foreign Application Priority Data

Feb. 10, 2020 (KR) .......................... 10-2020-0015510

(51) Int. Cl.
*G06F 21/32* (2013.01)
*G06F 3/041* (2006.01)
(Continued)

(52) U.S. Cl.
CPC ............ *G06F 21/32* (2013.01); *G06F 1/1652* (2013.01); *G06F 1/1677* (2013.01);
(Continued)

(58) Field of Classification Search
CPC .... G06F 1/1641; G06F 1/1652; G06F 1/3231; G06F 3/041; G06F 1/1684; G06F 1/1671;
(Continued)

(56) References Cited

U.S. PATENT DOCUMENTS

| 2015/0186706 A1 | 7/2015 | Pierce et al. |
| 2016/0026381 A1 | 1/2016 | Kim et al. |

(Continued)

FOREIGN PATENT DOCUMENTS

| EP | 2 977 850 | 1/2016 |
| EP | 3 089 064 | 11/2016 |

(Continued)

OTHER PUBLICATIONS

Extended Search Report and Written Opinion dated May 13, 2022 in counterpart International Patent Application No. 21753789.3.

(Continued)

*Primary Examiner* — Yaron Cohen
(74) *Attorney, Agent, or Firm* — Nixon & Vanderhye P.C.

(57) ABSTRACT

In various embodiments, an electronic device, at least a part of which is bendable, may include: at least one input device including a fingerprint sensor disposed therein, a memory, and a processor operatively connected to the at least one input device and the memory. The processor may be configured to: detect a user input through the at least one input device based on the fingerprint sensor being in an inactive state, identify at least one particular function stored in the memory in response to the detected user input, activate the fingerprint sensor based on the identified at least one particular function being a function requiring user authentication, perform user authentication corresponding to the user input using the activated fingerprint sensor, and control the electronic device to perform the at least one particular function corresponding to the user input upon successful user authentication.

21 Claims, 14 Drawing Sheets

(51) Int. Cl.
*G06F 1/16* (2006.01)
*G06V 40/13* (2022.01)

(52) U.S. Cl.
CPC ............ *G06F 1/1681* (2013.01); *G06F 3/041* (2013.01); *G06V 40/13* (2022.01); *G06V 40/1329* (2022.01)

(58) Field of Classification Search
CPC .... G06F 1/325; G06F 3/04164; G06F 1/3215; G06F 1/1681; G06F 1/1677; G06F 21/629; G06F 21/32; G06F 2203/04102; G06V 40/1329; G06V 40/13; Y02D 10/00
See application file for complete search history.

(56) References Cited

U.S. PATENT DOCUMENTS

| | | | |
|---|---|---|---|
| 2016/0042166 A1* | 2/2016 | Kang | G06F 3/04886 726/7 |
| 2016/0171281 A1 | 6/2016 | Park et al. | |
| 2016/0299556 A1 | 10/2016 | Jeung et al. | |
| 2016/0357221 A1 | 12/2016 | Huh | |
| 2016/0372088 A1 | 12/2016 | Dow et al. | |
| 2018/0157893 A1 | 6/2018 | Lee et al. | |
| 2019/0028579 A1 | 1/2019 | Cho et al. | |
| 2019/0042066 A1* | 2/2019 | Kim | G06F 3/1446 |
| 2019/0354661 A1 | 11/2019 | Lu et al. | |

FOREIGN PATENT DOCUMENTS

| | | |
|---|---|---|
| EP | 3 285 133 | 2/2018 |
| EP | 3 528 155 | 8/2019 |
| KR | 10-1659032 | 9/2016 |
| KR | 10-2016-0143115 | 12/2016 |
| KR | 10-2017-0082926 | 7/2017 |
| KR | 10-2018-0062690 | 6/2018 |
| KR | 10-1942950 | 1/2019 |
| WO | 2017/086498 | 5/2017 |

OTHER PUBLICATIONS

International Search Report dated Jun. 1, 2021 in corresponding International Application No. PCT/KR2021/001753.

* cited by examiner

ELECTRONIC DEVICE AND METHOD FOR ACTIVATING FINGERPRINT SENSOR

CROSS-REFERENCE TO RELATED APPLICATION

This application is based on and claims priority under 35 U.S.C. § 119 to Korean Patent Application No. 10-2020-0015510, filed on Feb. 10, 2020, in the Korean Intellectual Property Office, the disclosure of which is incorporated by reference herein in its entirety.

BACKGROUND

Field

The disclosure relates to an electronic device and method for activating a fingerprint sensor.

Description of Related Art

With the growth of electronic technology, various kinds of flexible electronic devices are being developed. For example, a flexible electronic device may be implemented by replacing a glass substrate surrounding a liquid crystal with a plastic film in a conventional liquid crystal display (LCD) or an organic light emitting diode (OLED) and thereby providing a display with flexibility to be folded or unfolded. In addition, a flexible electronic device may have a housing capable of being folded or unfolded at least in part.

As such flexible (including foldable, bendable, or rollable) electronic devices become commercially available, new interfacing techniques for the devices are being studied using the bending or folding properties of a flexible display.

The flexible electronic device is capable of folded at least in part, and may operate in each of a folded state and an unfolded state. The flexible electronic device being in the folded state is be convenient to carry and easily stored in a small size. The flexible electronic device being in the unfolded state has an increased display screen and thereby improves user's visibility.

A certain flexible electronic device may include an input device (e.g., a button) having a fingerprint sensor for performing user authentication and at least partially exposed to the outside. When this flexible electronic device is in the folded state and thus has a reduced size, a user's touch input may often occur through the fingerprint sensor included in the input device. Therefore, a situation in which the fingerprint sensor malfunctions in response to such a user's touch input may frequently happen.

SUMMARY

Embodiments of the disclosure provide an electronic device and method for activating a fingerprint sensor being in an inactive state in response to a user input and performing user authentication through the fingerprint sensor.

According to various example embodiments of the disclosure, an electronic device, at least a part of which is bendable, may include: at least one input device having a fingerprint sensor disposed therein, a memory, and a processor operatively connected to the at least one input device and the memory. The processor may be configured to: detect a user input through the at least one input device based on the fingerprint sensor being in an inactive state, identify at least one particular function stored in the memory in response to the detected user input, activate the fingerprint sensor based on the identified at least one particular function being a function requiring user authentication, perform user authentication corresponding to the user input using the activated fingerprint sensor, and control the electronic device to perform the at least one particular function corresponding to the user input upon successful user authentication.

According to various example embodiments of the disclosure, a method of operating an electronic device at least a part of which is bendable may include: detecting a user input through at least one input device in which a fingerprint sensor being in an inactive state is disposed, identifying at least one particular function corresponding to the detected user input in response to the user input, activating the fingerprint sensor based on the identified at least one particular function being a function requiring user authentication, performing user authentication corresponding to the user input using the activated fingerprint sensor, and performing the at least one particular function corresponding to the user input upon successful user authentication.

According to various example embodiments of the disclosure, in an electronic device having an inactive fingerprint sensor, the fingerprint sensor may be switched from an inactive state to an active state in response to one input. That is, in response to one input, the electronic device is capable of activating the fingerprint sensor to perform user authentication and also performing at least one particular function. Therefore, both user authentication and at least one particular function can be substantially simultaneously performed with one input, and user convenience can be improved.

BRIEF DESCRIPTION OF THE DRAWINGS

The above and other aspects, features and advantages of certain embodiments of the present disclosure will be more apparent from the following detailed description, taken in conjunction with the accompanying drawings.

DETAILED DESCRIPTION

Hereinafter, various example embodiments of the disclosure will be described in greater detail with reference to the accompanying drawings.

Figure 1:
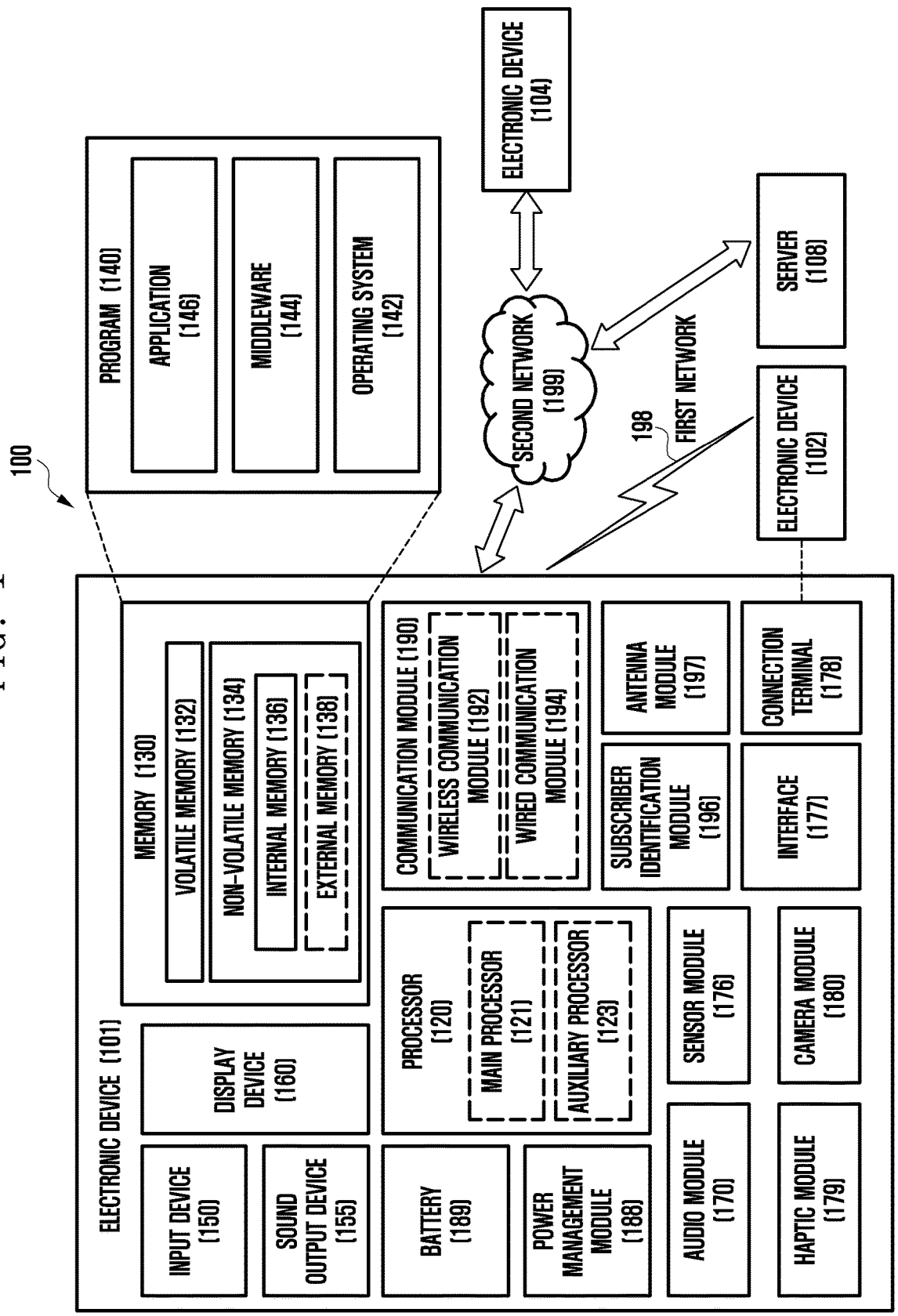
FIG. 1 is a block diagram illustrating an example electronic device in a network environment according to various embodiments.

FIG. 1 is a block diagram illustrating an example electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identity module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen). The input device 150 may include a physical key for controlling at least in part the electronic device 101. For example, the input device 150 may include a volume key for controlling the volume level of audio and a specific key for executing at least one program (e.g., Bixby).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes. According to an embodiment, the camera module 180 may include a front camera disposed on the front surface of the electronic device 101 and a rear camera disposed on the rear surface of the electronic device 101.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
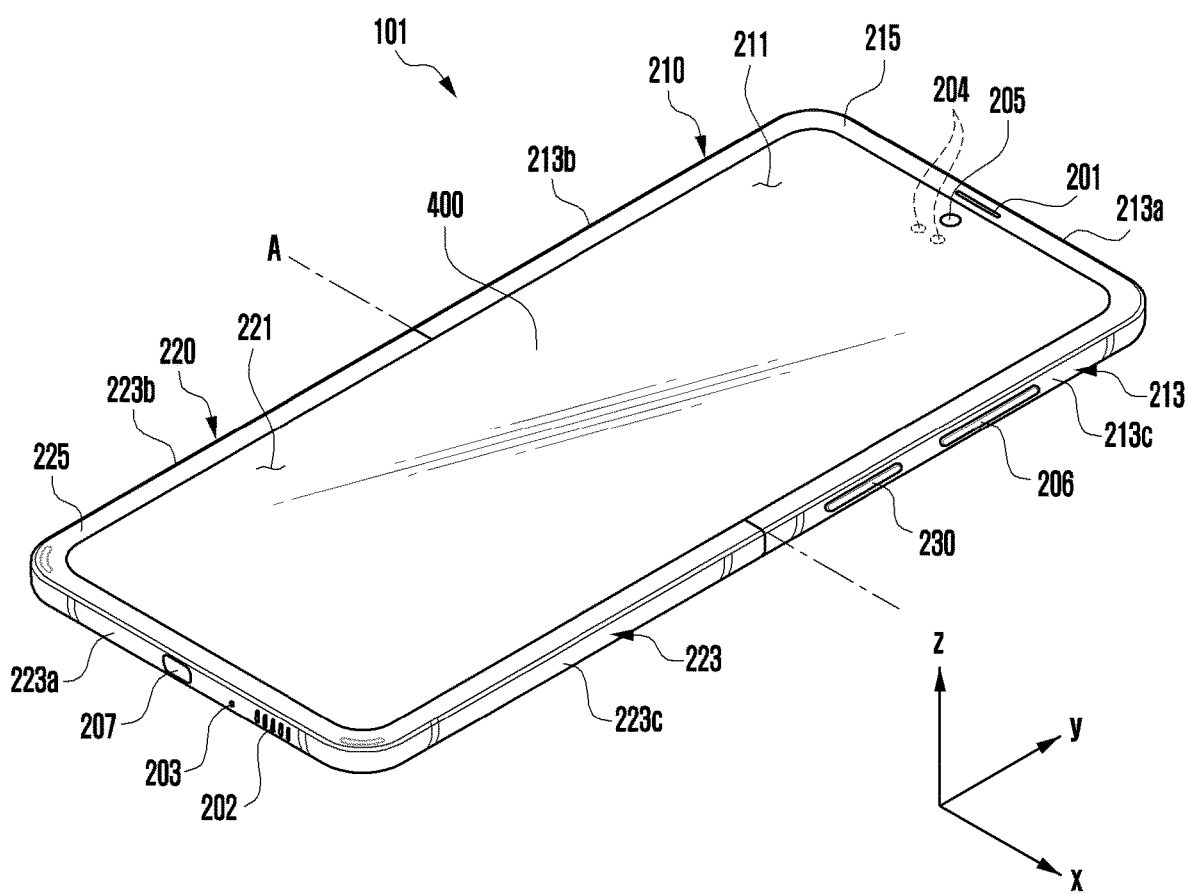
FIG. 2A is a front perspective view illustrating an unfolded state of an electronic device according to various embodiments.
Figure 2B:
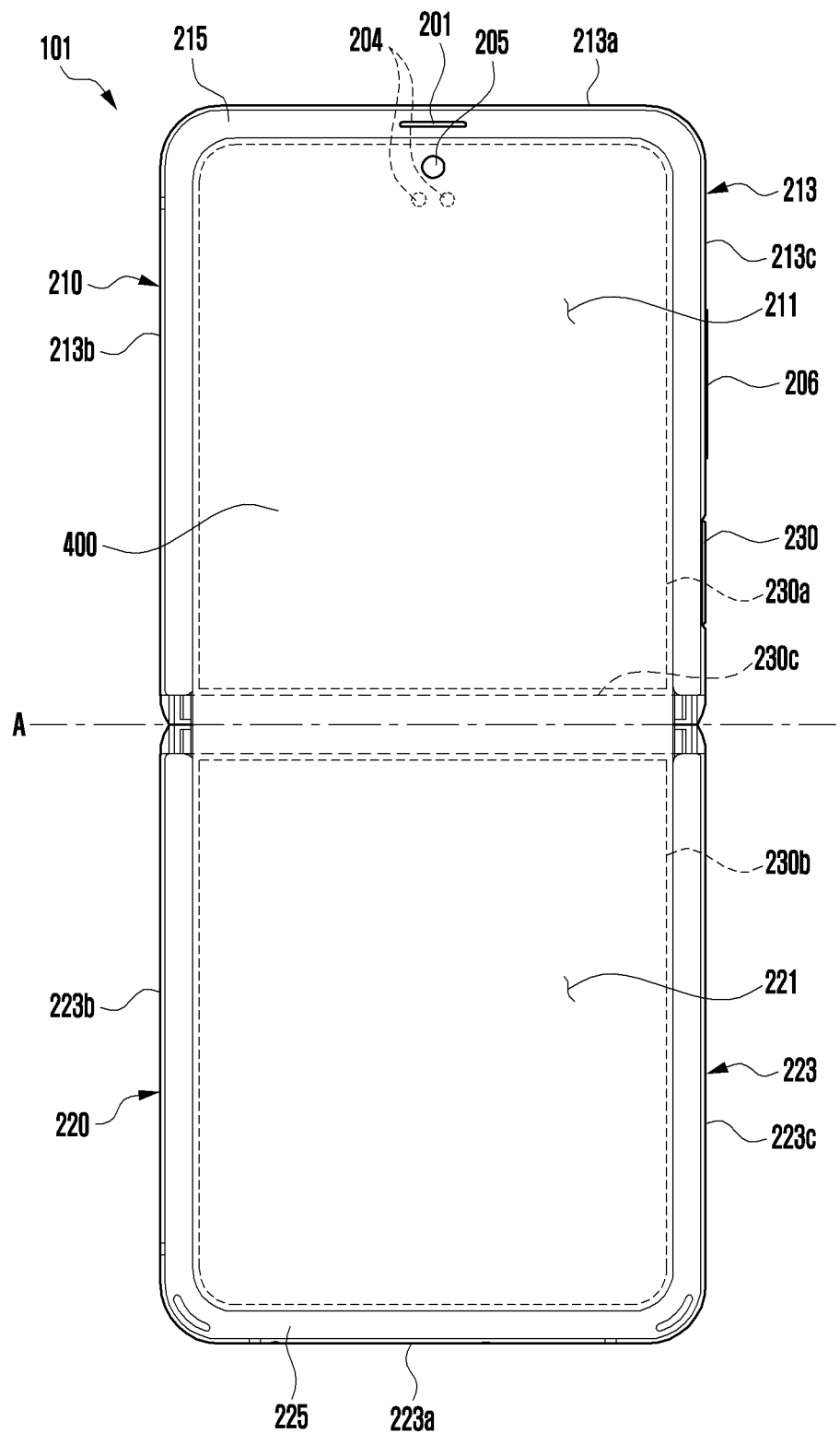
FIG. 2B is a plan view illustrating a front surface of an electronic device in an unfolded state according to various embodiments.
Figure 3A:
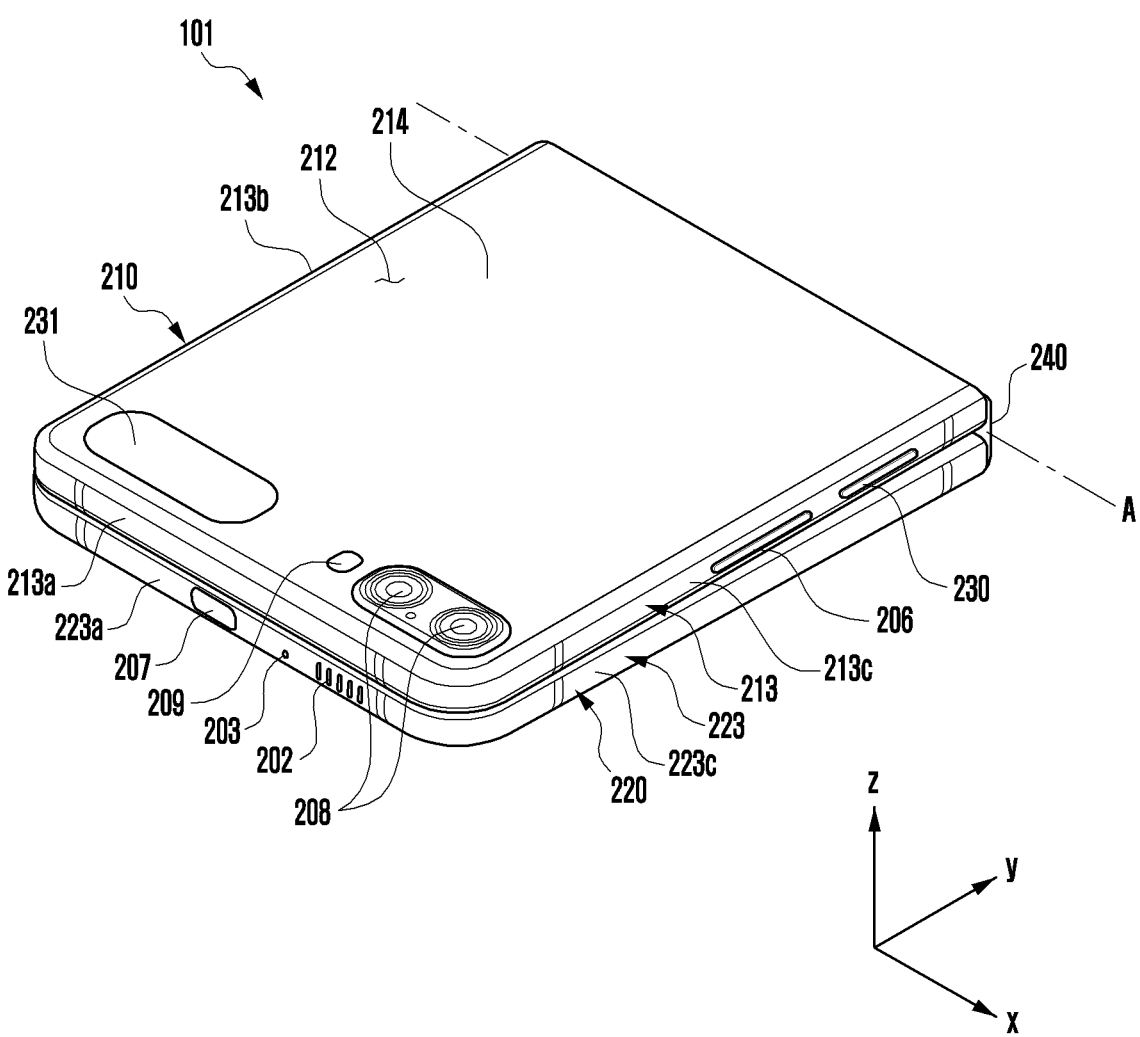
FIG. 3A is a perspective view illustrating a folded state of an electronic device according to various embodiments.
Figure 3B:
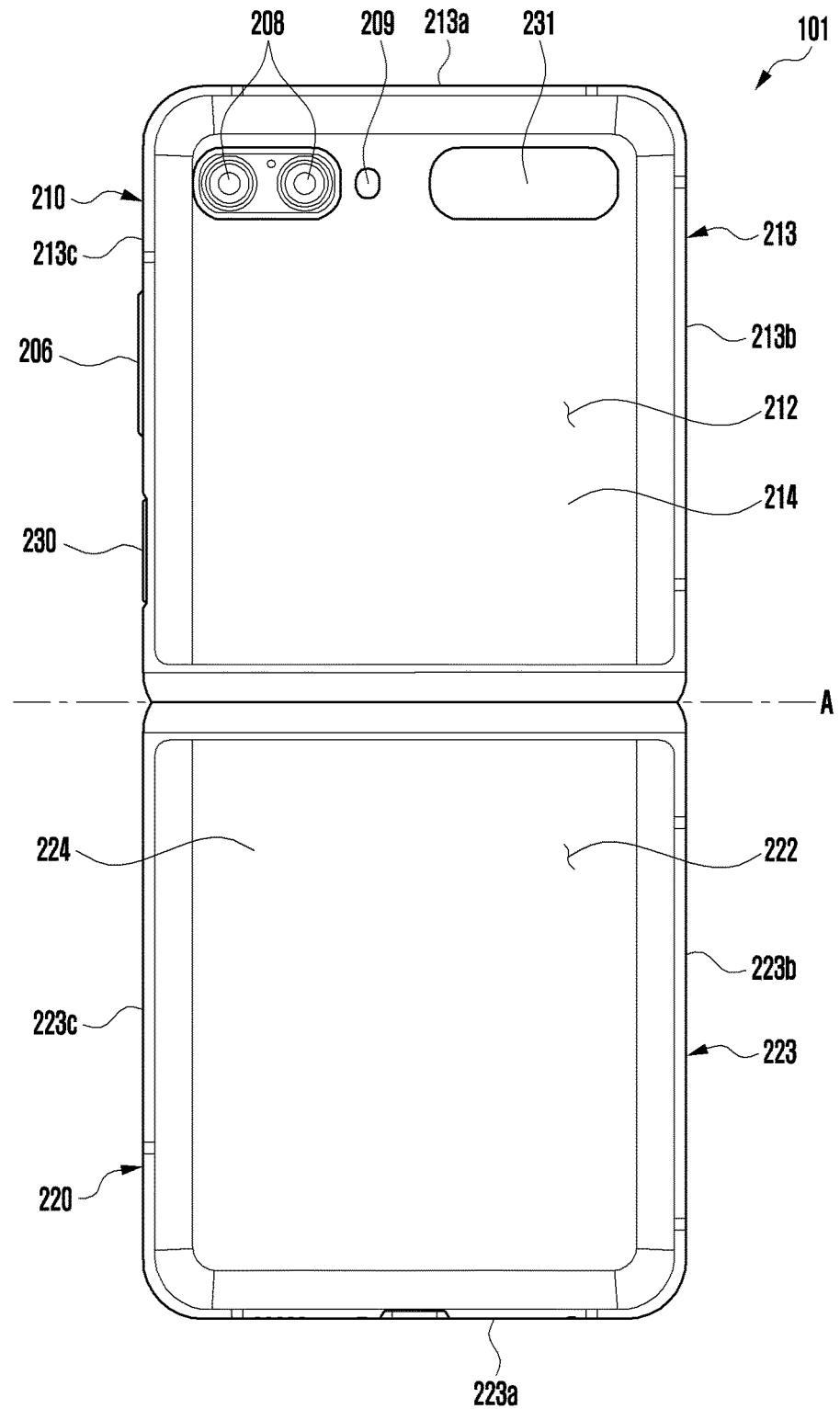
FIG. 3B is a plan view illustrating a rear surface of an electronic device in an unfolded state according to various embodiments.
Figure 3C:
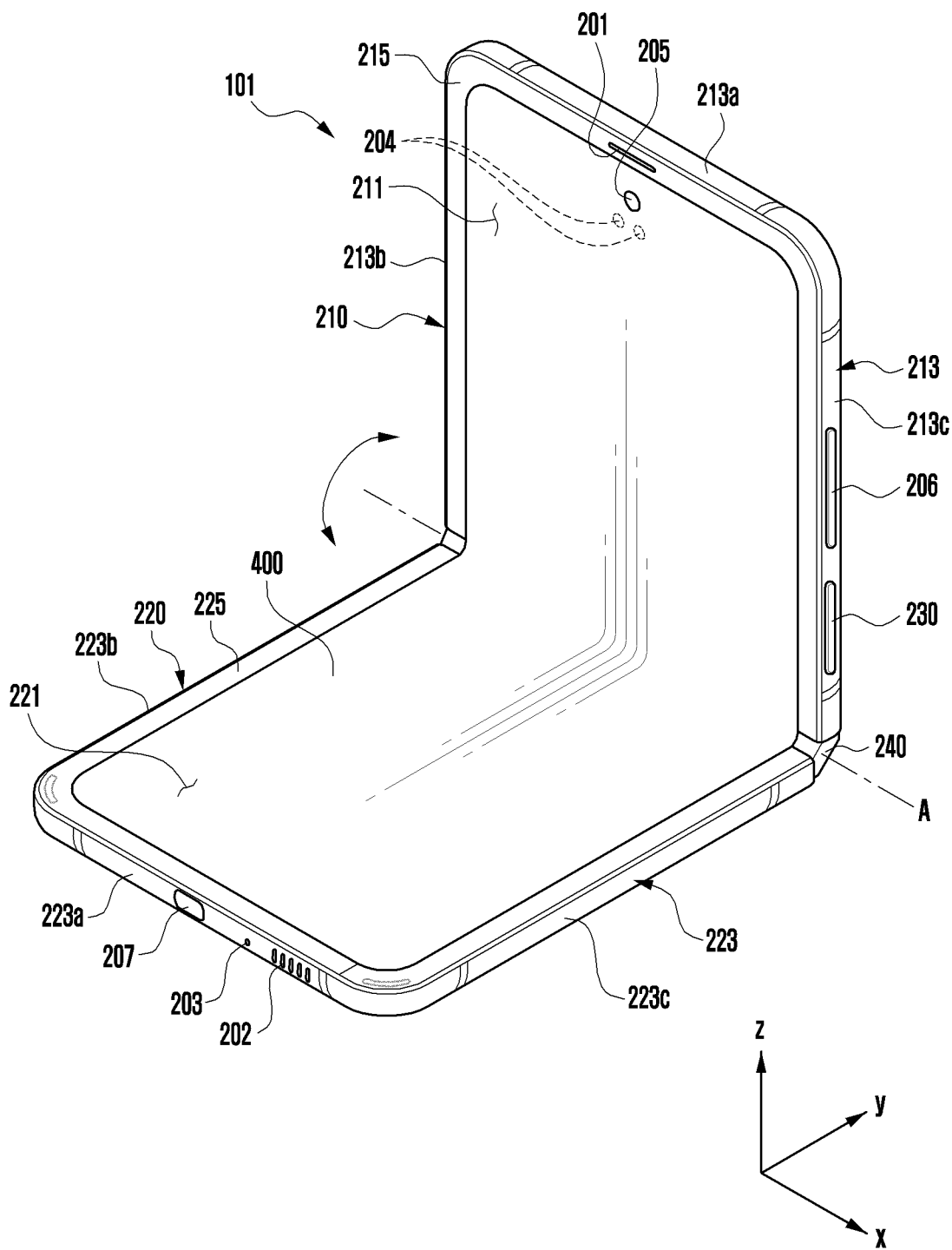
FIG. 3C is a front perspective view illustrating an intermediate state of an electronic device according to various embodiments.
Figure 3D:
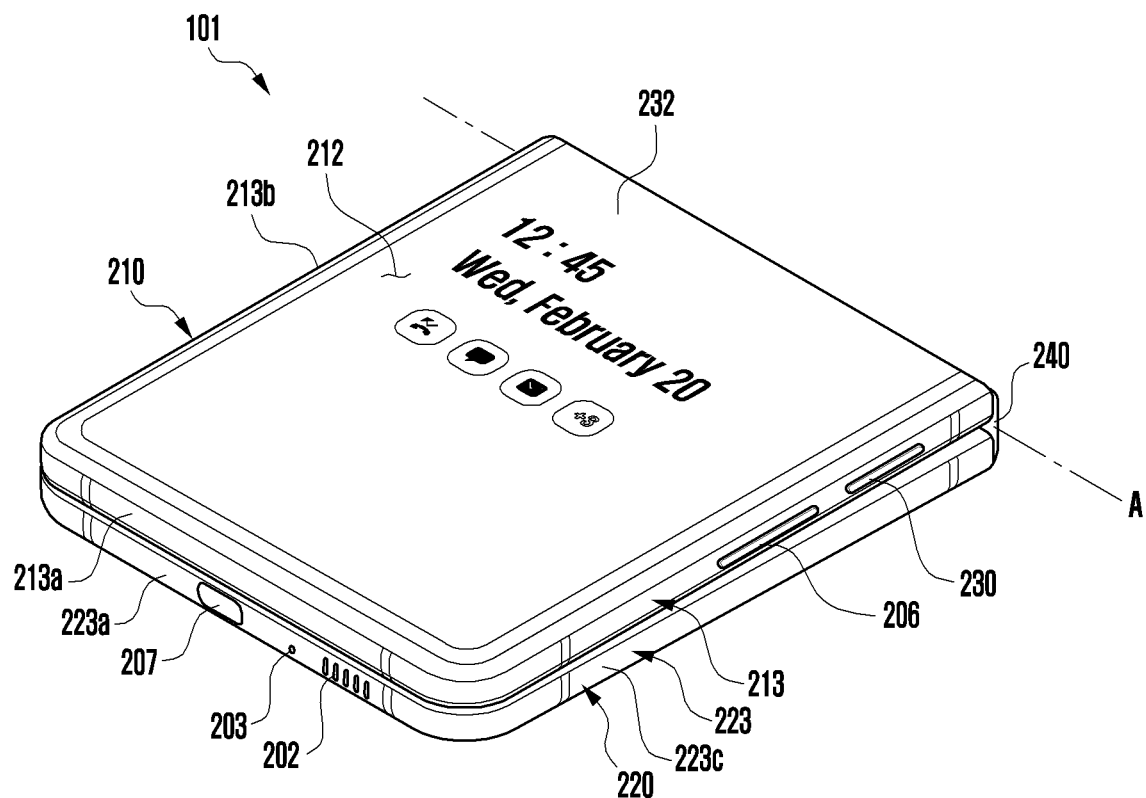
FIG. 3D is a perspective view illustrating a display of an electronic device in a folded state according to various embodiments.
Figure 3E:
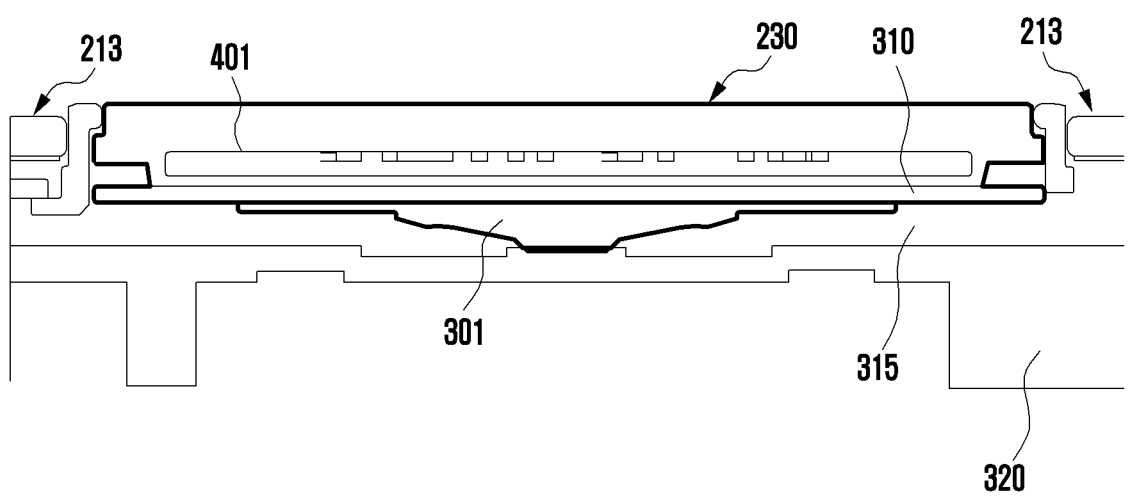
FIG. 3E is a cross-sectional view illustrating a key input device with a fingerprint sensor disposed at least in part according to various embodiments.

FIG. 2A is a front perspective view illustrating an unfolded state of an electronic device according to various embodiments. FIG. 2B is a plan view illustrating a front surface of an electronic device in an unfolded state according to various embodiments. FIG. 3A is a perspective view illustrating a folded state of an electronic device according to various embodiments. FIG. 3B is a plan view illustrating a rear surface of an electronic device in an unfolded state according to various embodiments. FIG. 3C is a front perspective view illustrating an intermediate state of an electronic device according to various embodiments. FIG. 3D is a perspective view illustrating a display of an electronic device in a folded state according to various embodiments. FIG. 3E is a cross-sectional view illustrating a key input device with a fingerprint sensor disposed at least in part according to various embodiments.

Referring to FIGS. 2A, 2B, 3A, 3B, 3C, 3D and 3E, the electronic device 101 may include a pair of housings (e.g., a foldable housing), e.g., a first housing 210 and a second housing 220, which are rotatably combined with each other and are foldable to face each other based on a hinge module 240 (see FIG. 3A). According to an embodiment, the electronic device 101 may include a flexible display 400 (e.g., a foldable display) disposed in an area formed by the pair of housings 210 and 220. According to an embodiment, the first housing 210 and the second housing 220 are disposed on both sides around a folding axis (shown as an axis A) and may have a shape that is generally symmetric with respect to the folding axis. According to an embodiment, depending on whether the electronic device 101 is in an unfolded state (or a flat state), a folded state, or an intermediate state, the first housing 210 and the second housing 220 may vary in an angle or distance therebetween.

According to various embodiments, the pair of housings 210 and 220 may include the first housing 210 (or a first housing structure) connected to the hinge module 240, and the second housing 220 (or a second housing structure) connected to the hinge module 240. According to an embodiment, the first housing 210 may have a first surface 211 facing a first direction (e.g., a front direction, e.g., the z-axis direction) in the unfolded state, and a second surface 212 opposite to the first surface 211 and facing a second direction (e.g., a rear direction, e.g., the negative z-axis direction) in the unfolded state. According to an embodiment, the second housing 220 may have a third surface 221 facing the first direction in the unfolded state, and a fourth surface 222 opposite to the third surface 221 and facing the second direction in the unfolded state. According to an embodiment, the first surface 211 of the first housing 210 and the third surface 221 of the second housing 220 are directed to the same first direction in the unfolded state, and face each other in the folded state. According to an embodiment, the second surface 212 of the first housing 210 and the fourth surface 222 of the second housing 220 are directed to the same second direction in the unfolded state, and face opposite directions in the folded state.

According to various embodiments, the first housing 210 may include a first lateral frame 213 forming at least partially the lateral surface of the electronic device 101, and a first rear cover 214 combined with the first lateral frame 213 and forming at least a part of the second surface 212 of the electronic device 101. According to an embodiment, the first lateral frame 213 may have a first lateral portion 213a, a second lateral portion 213b extended from one end of the first lateral portion 213a, and a third lateral portion 213c extended from the other end of the first lateral portion 213a. According to an embodiment, the first, second, and third lateral portions 213a, 213b, and 213c of the first lateral frame 213 may form three sides of a quadrangle (e.g., square or rectangle).

According to various embodiments, the second housing 220 may include a second lateral frame 223 forming at least partially the lateral surface of the electronic device 101, and a second rear cover 224 combined with the second lateral frame 223 and forming at least a part of the fourth surface 222 of the electronic device 101. According to an embodiment, the second lateral frame 223 may have a fourth lateral portion 223a, a fifth lateral portion 223b extended from one end of the fourth lateral portion 223a, and a sixth lateral portion 223c extended from the other end of the fourth lateral portion 223a. According to an embodiment, the fourth, fifth, and sixth lateral portions 223a, 223b, and 223c of the second lateral frame 223 may form three sides of a quadrangle (e.g., square or rectangle).

According to various embodiments, the pair of housings 210 and 220 is not limited to illustrated shape, structure, and configuration, and may be implemented through any other shape, structure, and configuration. For example, the first lateral frame 213 may be integrally formed with the first rear cover 214, and the second lateral frame 223 may be integrally formed with the second rear cover 224.

According to various embodiments, when the electronic device 101 is in the unfolded state, the second lateral portion 213b of the first lateral frame 213 and the fifth lateral portion 223b of the second lateral frame 223 may be connected to each other without any gap. Similarly, in the unfolded state, the third lateral portion 213c of the first lateral frame 213 and the sixth lateral portion 223c of the second lateral frame 223 may be connected to each other without any gap. Also, in the unfolded state, the sum of the second lateral portion 213b and the fifth lateral portion 223b is greater in length than each of the first lateral portion 213a and the fourth lateral portion 223a.

According to various embodiments, the first lateral frame 213 and the second lateral frame 223 may be formed of metal or may further include a polymer injected into the metal. According to an embodiment, the first lateral frame 213 and the second lateral frame 223 may include at least one conductive portion electrically segmented through at least one segmented portion formed of a polymer. In this case, the at least one conductive portion may be electrically connected to a wireless communication circuit included in the electronic device 101, thereby being used as an antenna that operates in at least one designated band (e.g., a legacy band).

According to various embodiments, the first rear cover 214 and the second rear cover 224 may be formed of coated or colored glass, ceramic, polymer, metal (e.g., aluminum, stainless steel (STS), or magnesium), or any combination thereof.

According to various embodiments, the flexible display 400 may be disposed to extend from the first surface 211 of the first housing 210 to at least a part of the third surface 221 of the second housing 220 across the hinge module 240. For example, the flexible display 400 may include a first flat portion 230a substantially corresponding to the first surface 211, a second flat portion 230b substantially corresponding to the second surface 221, and a bendable portion 230c connecting the first flat portion 230a and the second flat portion 230b and corresponding to the hinge module 240. According to an embodiment, the electronic device 101 may include a first protective cover 215 (e.g., a first protective frame or a first decorative member) combined with an edge of the first housing 210, and may also include a second protective cover 225 (e.g., a second protective frame or a second decorative member) combined with an edge of the second housing 220. According to an embodiment, the first protective cover 215 and the second protective cover 225 may be formed of a metal or polymer material. According to an embodiment, the first protective cover 215 and/or the second protective cover 225 may be used as a decorative member. According to an embodiment, the flexible display 400 may be positioned such that an edge of the first flat portion 230a is interposed between the first housing 210 and the first protective cover 215. Similarly, the flexible display 400 may also be positioned such that an edge of the second flat portion 230b is interposed between the second housing 220 and the second protective cover 225. In addition, the flexible display 400 may be positioned such that a protective cap disposed in a region corresponding to the hinge module 240 protects a corresponding edge of the flexible display 400. Therefore, substantially all edges of the flexible display 400 may be protected from the outside.

According to various embodiments, the electronic device 101 may further include a sub-display 231 (see FIG. 3A) disposed separately from the flexible display 400. According to an embodiment, the sub-display 231 may be disposed to be exposed at least partially on the second surface 212 of the first housing 210. Thus, in the folded state, the sub-display 231 may display status information of the electronic device 101 by replacing a display function of the flexible display 400. According to an embodiment, the sub-display 231 may be disposed to be visible from the outside through at least a portion of the first rear cover 214. In some embodiments, the sub-display 231 may be disposed on the fourth surface 224 of the second housing 220. In this case, the sub-display 231 may be disposed to be visible from the outside through at least a portion of the second rear cover 224. According to an embodiment, the sub-display 231 may be disposed to be entirely exposed to the second surface 212 of the first housing 210, thus improving user convenience.

According to various embodiments, the electronic device 101 may further include at least one of an audio input device 203, audio output devices 201 and 202, a sensor module 204, camera devices 205 and 208, key input devices 206 and 230, or a connector port 207.

According to various embodiments, the audio input device 203 may include at least one microphone hole 203 disposed in the first housing 210. In some embodiments, the audio input device 203 may include a plurality of microphones disposed to detect a direction of a sound. In some embodiments, the plurality of microphones may be disposed at suitable positions in the first housing 210 and/or the second housing 220. According to an embodiment, the audio output devices 201 and 202 may include speakers 201 and 202. In an embodiment, the speakers 201 and 202 may include a call receiver 201 disposed in the first housing 210 and a speaker 202 disposed in the second housing 220. In some embodiments, the microphone 203, the speakers 201 and 202, and the connector port 207 may be disposed in a space provided to the first housing 210 and/or the second housing 220, and exposed to external environments through at least one hole formed on the first housing 210 and/or the second housing 220. According to an embodiment, at least one connector port 207 may be used to transmit and receive power and/or data to and from an external electronic device. In some embodiments, the at least one connector port (e.g., an ear jack hole) may accommodate a connector (e.g., an ear jack) for transmitting and receiving an audio signal to and from an external electronic device. In some embodiments, the hole(s) formed in the first housing 210 and/or the second housing 220 may be commonly used for the microphone 203 and the speakers 201 and 202. In some embodiments, the audio output devices 201 and 202 may include a speaker (e.g., a piezo speaker) capable of operating without any hole formed in the first housing 210 and/or the second housing 220.

According to various embodiments, the sensor module 204 may generate an electrical signal or data value corresponding to an internal operating state or external environmental state of the electronic device 101. The sensor module 204 may detect an external environment through the first surface 211 of the first housing 210. In some embodiments, the electronic device 101 may further include at least one sensor module disposed to detect an external environment through the second surface 212 of the first housing 210. According to an embodiment, the sensor module 204 may be disposed under the flexible display 400 to detect an external environment through the flexible display 400. In various embodiments, the sensor module 204 may include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, a proximity sensor, an ultrasonic sensor, or an illumination sensor 204.

According to various embodiments, the camera devices 205 and 208 may include a first camera device 205 (e.g., a front camera device) disposed on the first surface 211 of the first housing 210, and a second camera device 208 (e.g., a rear camera device) disposed on the second surface 212 of the first housing 210. In some embodiments, the electronic device 101 may further include a flash 209 disposed near the second camera device 208. In some embodiments, each of the camera devices 205 and 208 may include one or more lenses, an image sensor, and/or an image signal processor. The flash 209 may include, for example, a light emitting diode or a xenon lamp. In some embodiments, the camera device may be disposed such that two or more lenses (a wide-angle lens, an ultra-wide-angle lens, and/or a telephoto lens) and the image sensor are positioned near one surface of the electronic device 101. In some embodiments, the camera devices 205 and 208 may include lenses for time of flight (TOF) and a related image sensor.

According to various embodiments, the key input devices 206 and 230 (e.g., key buttons) may be disposed along the third lateral portion 213c of the first lateral frame 213 of the first housing 210. For example, the key input devices 206 and 230 may include a first key input device 230 for executing at least one program (e.g., Bixby) and a second key input device 206 for controlling the volume level of audio. In some embodiments, the key input device 206 and 230 may be disposed along at least one of the other lateral portions 213a and 213b of the first housing 210 and/or the lateral portions 223a, 223b, and 223c of the second housing 220. In some embodiments, the electronic device 101 may not include some or all of the key input devices 206 and 230, and the key input device(s) 206 and/or 230 that is/are not included may be implemented in any other form such as a soft key on the flexible display 400. In some embodiments, the key input devices 206 and 230 may be implemented using a pressure sensor included in the flexible display 400. According to various embodiments, the key input devices 206 and 230 may be implemented using a fingerprint sensor for acquiring user's fingerprint information. For example, a fingerprint sensor may be disposed at least in part in the first key input device 230 for executing at least one program. According to an embodiment, the position where the fingerprint sensor is disposed is not limited to the first key input device 230. According to an embodiment, a processor (e.g., the processor 120 in FIG. 1) may execute the at least one program in response to a user input to the first key input device 230, and also activate the fingerprint sensor substantially simultaneously. Then, the activated fingerprint sensor may acquire fingerprint information of a user corresponding to the user input.

According to various embodiments, the first camera device 205 and the sensor module 204 may be disposed to be exposed through the flexible display 400. For example, the first camera device 205 and the sensor module 204 may be disposed in the inner space of the electronic device 101 and exposed to an external environment through an opening (e.g., a through-hole) formed in the flexible display 400. In an embodiment, the sensor module 204 may be disposed in the inner space of the electronic device 101 so as not to be visually exposed through the flexible display 400. In this case, a region of the flexible display 400 facing the sensor module may not need to be opened.

Referring to FIG. 3C, the electronic device 101 may operate to maintain the intermediate state through the hinge module 240. In this case, the electronic device 101 may control the flexible display 400 to respectively display different contents in a display area corresponding to the first surface 211 and another display area corresponding to the third surface 221. According to an embodiment, at a specific angle (e.g., an angle between the first and second housings 210 and 220 in the intermediate state), the electronic device 101 may operate continuously between the unfolded state and the folded state through the hinge module 240. For example, when a slight pressing force is applied in an opening direction in the intermediate state partially unfolded at the specific angle, the electronic device 101 may continuously operate to enter the fully unfolded state through the hinge module 240. In addition, when a slight pressing force is applied in a closing direction in the intermediate state partially unfolded at the specific angle, the electronic device 101 may continuously operate to enter the fully folded state through the hinge module 240. In some embodiments, the electronic device 101 may operate to maintain the intermediate state at various angles through the hinge module 240.

Referring to FIG. 3D, when the first housing 210 and the second housing 220 are folded to each other, another display 232 may be disposed in the entire area corresponding to the second surface 212 of the first housing 210. According to an embodiment, when the electronic device 101 is in the folded state, another display 232 may display various user interfaces by replacing the flexible display 400. This display 232 may include a touchscreen display and perform at least one function in response to a touch-sensitive user input.

Referring to FIG. 3E, in the electronic device 101, the first input device 230 may be disposed in the third lateral portion 213c of the first lateral frame 213 of the first housing 210. The first input device 230 may include, for example, a fingerprint sensor 401 for acquiring user's fingerprint information, a dome key 301 for executing at least one program (e.g., Bixby), and a substrate 310 for processing a signal corresponding to a user input. According to an embodiment, the processor 120 of the electronic device 101 may transmit a signal for performing a function corresponding to the dome key 301 to the substrate 310 in response to a user input. According to an embodiment, the processor 120 may acquire fingerprint information corresponding to a user input through the fingerprint sensor 401 and deliver the acquired fingerprint information to the substrate 310. The fingerprint sensor 401 may acquire fingerprint information, based on at least one of a capacitive scheme, an optical scheme, and/or an ultrasonic scheme. That is, the fingerprint sensor 401 may identify the amount of change in capacitance, in quantity of light, and/or in ultrasonic signal, and thereby acquire fingerprint information about a user touch input on an outer surface of the first input device 230. For example, the electronic device 101 may measure the amount of change in quantity of light using a light source of the display and, based on the measured amount of change in quantity of light, acquire fingerprint information corresponding to a user input. According to some embodiments, the fingerprint sensor 401 may acquire fingerprint information, based on various schemes other than the above-mentioned schemes. According to an embodiment, the substrate 310 may be electrically connected to a printed circuit board (PCB) 315 of the electronic device 101 and transmit a signal (e.g., information, data), received through the fingerprint sensor 401 and the dome key 301, to the PCB 315. For example, the PCB 315 disposed in the first housing may be a main PCB. According to an embodiment, the first input device 230 may be supported at least in part by a support member 320 of the electronic device 101.

According to an embodiment, the fingerprint sensor 401 may maintain an active state or an inactive state, and acquire fingerprint information corresponding to a user input in the active state. According to an embodiment, the electronic device 101 may enable, in the folded state, the fingerprint sensor 401 to maintain the inactive state, and also enable, in the unfolded state, the fingerprint sensor 401 to maintain the active state. According to an embodiment, the electronic device 101 may detect a user input to the first input device 230 and, in response to the user input, switch the fingerprint sensor 401 being in the inactive state into the active state. According to an embodiment, the electronic device 101 may perform at least one function corresponding to the dome key 301 in response to a user input, and substantially at the same time activate the fingerprint sensor 401 to perform a user authentication function corresponding the user input.

Figure 4:
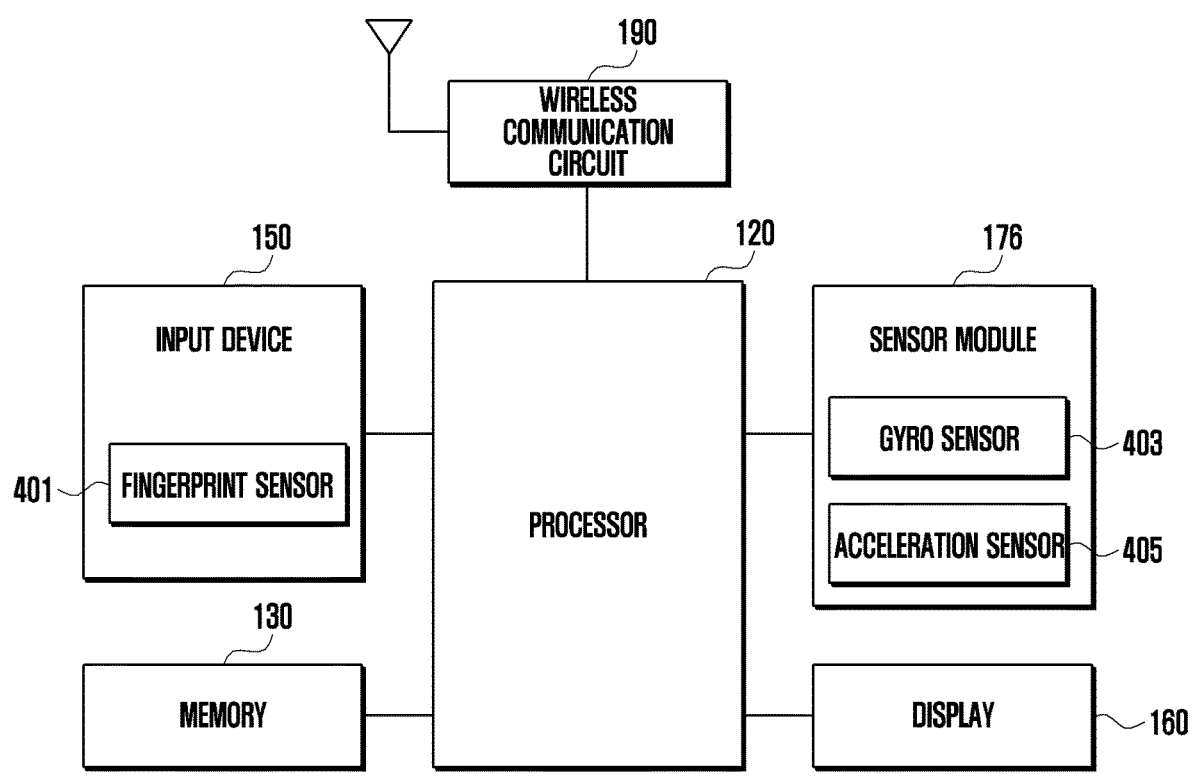
FIG. 4 is a block diagram illustrating an electronic device according to various embodiments.

FIG. 4 is a block diagram illustrating an example electronic device (e.g., the electronic device 101 in FIG. 1) according to various embodiments.

Referring to FIG. 4, the electronic device 101 may include a processor (e.g., including processing circuitry) 120 (e.g., the processor 120 in FIG. 1), a memory 130 (e.g., the memory 130 in FIG. 1), an input device (e.g., including input circuitry) 150 (e.g., the input device 150 in FIG. 1), a display 160 (e.g., the display device 160 in FIG. 1), a sensor module (e.g., including at least one sensor) 176 (e.g., the sensor module 176 in FIG. 1), and/or a wireless communication circuit 190 (e.g., the communication module 190 in FIG. 1). According to an embodiment, the electronic device 101 may switch a fingerprint sensor 401, disposed at least in part in the input device 150, from an inactive state to an active state, and acquire user's fingerprint information through the fingerprint sensor 401 being in the active state.

According to an embodiment, the processor 120 may include various processing circuitry and execute a program (e.g., the program 140 in FIG. 1) stored in the memory 130, thereby control at least one of other components (e.g., hardware or software components), and perform data processing or operations. According to an embodiment, the processor 120 may perform user authentication by comparing first fingerprint information acquired through the fingerprint sensor 401 with second fingerprint information stored in the memory 130. For example, if the first fingerprint information and the second fingerprint information are identical to each other, the processor 120 may determine user authentication to be successful.

According to an embodiment, the memory 130 may store user's fingerprint information for user authentication. For example, the user's fingerprint information may include a fingerprint image and information about an input direction of the fingerprint image. In addition, the memory 130 may store at least one function to be performed in response to a user input to the input device 150. For example, when a short input to the input device 150 is detected, the processor 120 may activate at least one display. In addition, when a long input to the input device 150 is detected, the processor 120 may switch the fingerprint sensor 401, being in the inactive state, to the active state.

According to an embodiment, the input device 150 may include various input circuitry and be disposed to be at least partially exposed to an outer surface of the electronic device 101. In the input device 150, the fingerprint sensor 401 may be disposed at least in part. According to an embodiment, the processor 120 may switch the fingerprint sensor 401 from the inactive state to the active state, and acquire user's fingerprint information through the fingerprint sensor 401 which is in the active state. The fingerprint sensor 401 may acquire fingerprint information, for example, based on at least one of a capacitive scheme, an optical scheme, or an ultrasonic scheme. According to an embodiment, the processor 120 may identify a user input type (e.g., a short input, a long input, a double input, and/or a combination of inputs using a plurality of buttons) through the input device 150. For example, when a long input is detected through the input device 150, the processor 120 may perform at least one particular function corresponding to the long input, and substantially at the same time activate the fingerprint sensor 401 to perform a user authentication function corresponding to the user input. According to an embodiment, in response to a single user input, the processor 120 may perform a plurality of functions (e.g., at least one particular function predefined to correspond to a user input and/or a user authentication function corresponding to a user input).

According to an embodiment, the sensor module 176 may include various sensors, including, for example, a gyro sensor 403 and/or an acceleration sensor 405, etc. According to an embodiment, the processor 120 may identify a posture of the electronic device 101 using the gyro sensor 403 and/or the acceleration sensor 405. For example, the processor 120 may check the degree (e.g., angle) in which the electronic device 101 is tilted based on up/down/left/right directions. According to an embodiment, the electronic device 101 may include a first housing (e.g., the first housing 210 in FIG. 2A) and a second housing (e.g., the second housing 220 in FIG. 2A). A main PCB may be disposed in the first housing 210, and a sub-PCB may be disposed in the second housing 220. A sub PCB (printed circuit board)) may be disposed. According to an embodiment, the gyro sensor 403 and/or the acceleration sensor 405 may be disposed in each of the main PCB and the sub-PCB. According to an embodiment, the electronic device 101 may calculate its posture and its folded angle using a plurality of sensors disposed in the first housing 210 and the second housing 220. Sensing data (e.g., raw data) of the gyro sensor 403 and/or the acceleration sensor 405 may be stored in the memory 130. According to an embodiment, the electronic device 101 may measure the amount of change in a plurality of sensing values corresponding to a plurality of sensors (e.g., the gyro sensor 403 and/or the acceleration sensor 405), and thereby calculate the posture of the electronic device 101. Then, based on the calculated posture, the electronic device 101 may determine the display 160 to be activated. Additionally, a hinge module (e.g., the hinge module 240 in FIG. 3A) disposed between the first housing 210 and the second housing 220 may include a certain sensor (e.g., a digital hall integrated circuit (IC), not shown) that recognizes the absolute angle of the electronic device 101 and corrects an angle value of the electronic device 101. For example, this sensor (e.g., a digital hall IC) may include angle-sensing sensor and be implemented in the form of a flexible PCB (FPCB). According to an embodiment, the electronic device 101 may correct sensing values corresponding to its posture and its angle using such a sensor (e.g., a digital hall IC). According to an embodiment, this sensor may include any other type of angle-sensing circuit other than the digital hall IC.

According to an embodiment, the display 160 may include a flexible display (e.g., the flexible display 400 in FIG. 3A) disposed to extend from a first surface (e.g., the first surface 211 in FIG. 2A) of a first housing (e.g., the first housing 210 in FIG. 2A) to at least a part of a third surface (e.g., the third surface 221 in FIG. 2A) of a second housing (e.g., the second housing 220 in FIG. 2A) across a hinge module (e.g., the hinge module 240 in FIG. 3A). According to an embodiment, the display 160 may include a sub-display (e.g., the sub-display 231 in FIG. 3A) disposed to be exposed at least partially on a second surface (e.g., the second surface 212 in FIG. 3A) of the first housing 210. According to an embodiment, the display 160 may further include another display (e.g., the display 232 in FIG. 3D) entirely disposed on the second surface 212 of the first housing 210 or a fourth surface (e.g., the fourth surface 222 in FIG. 3B) of the second housing 220.

According to an embodiment, the wireless communication circuit 190 may establish a communication channel between the electronic device 101 and another electronic device (e.g., the electronic device 102, 104, or 108 in FIG. 1) and perform communication through the communication channel. For example, the wireless communication circuit 190 may perform a call connection or message transmission and reception between the electronic device 101 and another electronic device.

According to various embodiments, the processor 120 may receive a user input through the input device 150 and identify at least one particular function predefined to correspond to the user input. When the identified function is a function that requires user authentication, the processor 120 may switch the fingerprint sensor 401 included in the input device 150 from an inactive state to an active state, and then acquire fingerprint information corresponding to the user input through the fingerprint sensor 401. The processor 120 may perform user authentication based on the acquired fingerprint information, and also perform the at least one particular function upon successful user authentication. According to an embodiment, the processor 120 may selectively activate the display 160, including at least one display as described above, to display a user interface corresponding to the at least one particular function.

According to an embodiment, the processor 120 may compare a first fingerprint image acquired through the fingerprint sensor 401 with a second fingerprint image stored in the memory 130, and determine an input direction of the first fingerprint image. According to an embodiment, the processor 120 may predict a user's gaze direction, based on the input direction of the first fingerprint image, and then selectively activate the at least one display corresponding to the user's gaze direction.

According to an embodiment, the processor 120 may identify a posture of the electronic device 101 using the gyro sensor 403 and the acceleration sensor 405 included in the sensor module 176. For example, the processor 120 may check tilted degrees of the electronic device 101 in the up/down/left/right directions. According to an embodiment, the processor 120 may determine at least one display to be activated, based on the posture of the electronic device 101. For example, the processor 120 may predict a user's gaze direction, based on the posture of the electronic device 101, and selectively activate the at least one display corresponding to the user's gaze direction. According to an embodiment, the processor 120 may detect the user's gaze direction using a camera module (e.g., the camera module 179 in FIG. 1), determine the at least one display corresponding to the gaze direction, and activate the determined display.

According to an embodiment, the processor 120 may determine a user's gaze direction, based on the posture of the electronic device 101 and/or the input direction of a fingerprint image acquired through the fingerprint sensor 401, and then activate the at least one display corresponding to the user's gaze direction. According to an embodiment, when executing at least one particular function, the processor 120 may display an execution screen for the at least one particular function on the activated display.

According to various example embodiments, an electronic device 101, at least a part of which is bendable, may include: at least one input device 150 having a fingerprint sensor 401 disposed therein, a memory 130, and a processor 120 operatively connected to the at least one input device 150 and the memory 130. The processor 120 may be configured to: detect a user input through the at least one input device 150 based on the fingerprint sensor 401 being in an inactive state, identify at least one particular function stored in the memory 130 in response to the detected user input, activate the fingerprint sensor 401 based on the identified at least one particular function being a function requiring user authentication, perform user authentication corresponding to the user input using the activated fingerprint sensor 401, and control the electronic device 101 to perform the at least one particular function corresponding to the user input upon successful user authentication.

According to an example embodiment, the electronic device 101 may further include a foldable housing including a hinge (e.g., the hinge module 240 in FIG. 3A), a first housing (e.g., the first housing structure 210 in FIG. 2A) connected to the hinge and including a first surface (e.g., the first surface 211 in FIG. 2A) facing a first direction and a second surface (e.g., the second surface 212 in FIG. 3A) facing a second direction opposite the first direction, and a second housing (e.g., the second housing structure 220 in FIG. 2A) connected to the hinge 240, including a third surface (e.g., the third surface 221 in FIG. 2A) facing a third direction and a fourth surface (e.g., the fourth surface 222 in FIG. 3B) facing a fourth direction opposite the third direction, the second housing being foldable to face the first housing 210 around the hinge 240. The first surface 211 may face the third surface 221 in a folded state, and the third direction may be a same direction as the first direction in an unfolded state.

According to an example embodiment, the electronic device 101 may further include a sensor module 176 including at least one sensor configured to detect an unfolded angle of the foldable housing, and the processor 120 may be configured to identify the unfolded angle of the foldable housing through the sensor module 176, and to switch the fingerprint sensor 401 from the inactive state to an active state based on the unfolded angle exceeding a predetermined threshold.

According to an example embodiment, the electronic device 101 may further include at least one display 160 disposed on the foldable housing, and the processor 120 may be configured to identify an input direction of a fingerprint image detected by the fingerprint sensor 401, to identify a posture of the electronic device 101 based on the input direction of the fingerprint image, to determine the at least one display 160, based on the posture of the electronic device 101, and to activate the determined at least one display 160.

According to an example embodiment, the electronic device 101 may further include a gyro sensor 403 and an acceleration sensor 405 configured to identify the posture of the electronic device 101, and the processor 120 may be configured to identify the posture of the electronic device 101 using the gyro sensor 403 and the acceleration sensor 405, to determine the at least one display 160, based on the input direction of the fingerprint image and the posture of the electronic device 101, and to activate the determined at least one display 160.

According to an example embodiment, the processor 120 may be configured to identify the posture of the electronic device 101 by comparing a first fingerprint image stored in the memory 130 and a second fingerprint image detected by the fingerprint sensor 401, to determine the at least one display 160 to be activated based on the identified posture, and to activate the determined at least one display 160.

According to an example embodiment, the function requiring user authentication may include a function performed using a user's personal information stored in the memory 130, and include at least one of a message transmission/reception function, a call transmission/reception function, and a payment-related function.

According to an example embodiment, based on activating the fingerprint sensor 401, the processor 120 may be configured to maintain an active state of the fingerprint sensor 401 for a predetermined time.

According to an example embodiment, the fingerprint sensor 401 may be disposed in the at least one input device and be configured to acquire fingerprint information corresponding to the user input based on a capacitive scheme, an optical scheme, or an ultrasonic scheme.

According to an example embodiment, based on first fingerprint information acquired using the fingerprint sensor 401 and second fingerprint information stored in the memory 130 being identical to each other, the processor 120 may be configured to determine that user authentication is successful.

According to an example embodiment, the memory 130 may store the at least one particular function to be performed in response to the user input.

Figure 5:
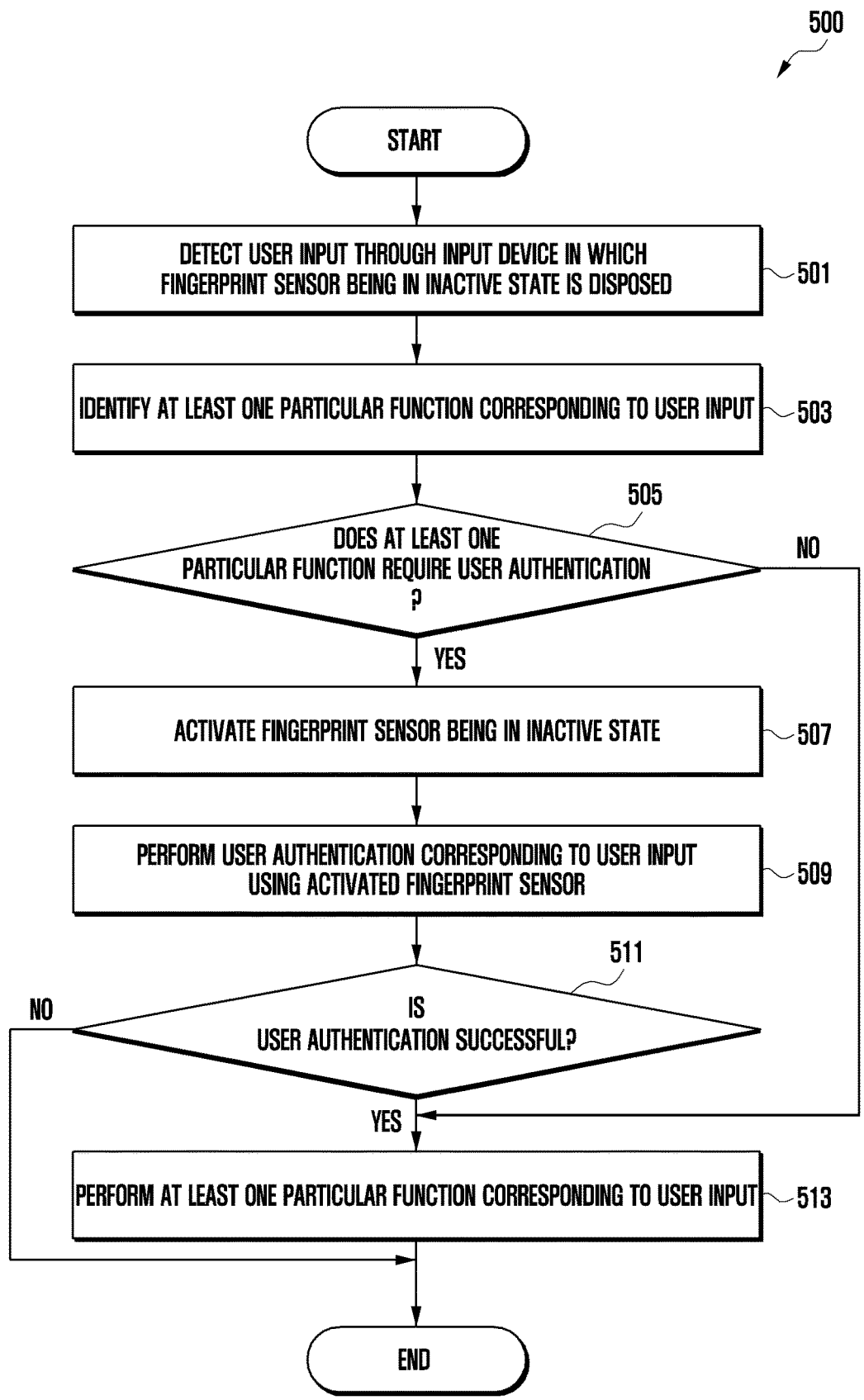
FIG. 5 is a flowchart illustrating an example method for activating a fingerprint sensor being in an inactive state in an electronic device according to various embodiments.

FIG. 5 is a flowchart 500 illustrating an example method for activating a fingerprint sensor being in an inactive state in an electronic device according to various embodiments.

Referring to FIG. 5, in a folded state of an electronic device (e.g., the electronic device 101 in FIG. 1), a fingerprint sensor (e.g., the fingerprint sensor 401 in FIG. 4) may be in an inactive state. According to an embodiment, the electronic device 101 may include a foldable electronic device that can be folded with respect to a hinge module (e.g., the hinge module 240 in FIG. 3A). The fingerprint sensor 401 may be in an active state in case of an unfolded state of the electronic device 101, and the fingerprint sensor 401 may be in an inactive state in case of a folded state of the electronic device 101. According to an embodiment, the fingerprint sensor 401 may be disposed at least in part in an input device (e.g., the input device 150 in FIG. 1, the first key input device 230 in FIG. 2A, or the second key input device 206 in FIG. 2A), and acquire user's fingerprint information in response to a user's touch input.

At operation 501, a processor (e.g., the processor 120 in FIG. 1) of the electronic device 101 may detect a user input through the first key input device 230 in which the fingerprint sensor 401 being in the inactive state is disposed. For example, the user input may include a short input of shortly pressing the first key input device 230, a long input of long pressing the first key input device 230, a double input of pressing twice the first key input device 230, and/or any input based on a combination of the first key input device 230 and the second key input device 206. According to an embodiment, the user input may also include a voice input using a microphone, such as a command input based on a user's voice.

At operation 503, the processor 120 may identify at least one particular function corresponding to the detected user input. According to an embodiment, the electronic device 101 may have several functions predefined to respectively correspond to user input types. For example, the processor 120 may activate a display (e.g., the display device 160 in FIG. 1) when the user input is a short input, and the processor 120 may perform at least one particular function corresponding to the first key input device 230 when the user input is a long input. According to an embodiment, in response to the user input, the processor 120 may identify at least one particular function predefined to correspond to the first key input device 230.

At operation 505, the processor 120 may determine whether the identified at least one particular function is a function that requires user authentication. This function requiring user authentication may include a function to be performed using user's personal information stored in a memory (e.g., the memory 130 in FIG. 1). For example, the function requiring user authentication may include a message transmission/reception function, a call transmission/reception function, and/or a function of executing a payment-related program (e.g., Samsung Pay, Apple Pay, and/or Kakao Pay). On the other hand, a function of executing a program that provides public information (e.g., weather, traffic conditions, and/or news) may not require user authentication.

When it is determined at the operation 505 that the identified function is a function requiring user authentication ("Yes" in operation 505), the processor 120 may switch the fingerprint sensor 401 being in the inactive state to the activated state at operation 507. For example, the processor 120 may maintain activation of the fingerprint sensor 401 for a predetermined time. If the predetermined time elapses after the fingerprint sensor 401 is activated, the processor 120 may switch the fingerprint sensor 401 to the inactive state. According to an embodiment, if a function to be executed requires user information, the processor 120 may switch the fingerprint sensor 401 from the inactive state to the active state and then acquire user information (e.g., fingerprint information) corresponding to a user input through the activated fingerprint sensor 401.

At operation 509, the processor 120 may perform user authentication corresponding to the user input using the activated fingerprint sensor 401. For example, the processor 120 may acquire a fingerprint image corresponding to the user input using a light source, and then extract first fingerprint information from the acquired fingerprint image. In addition, the processor 120 may compare the extracted first fingerprint information with second fingerprint information stored in the memory 130, and thereby determine whether the first fingerprint information is identical to second fingerprint information. If the first fingerprint information and the second fingerprint information match, that is, meet a predetermined criterion (e.g., exceeding a reference value), the processor 120 may determine that user authentication is successful.

At operation 511, the processor 120 may determine whether the user authentication is successful. For example, the processor 120 may set a reference value (e.g., similarity, matching value) for determining the success of user authentication, and measure similarity between the first fingerprint information corresponding to the user input and the second fingerprint information stored in the memory 130. When the measured similarity exceeds the reference value, the processor 120 may determine that the user authentication corresponding to the user input is successful. If the user authentication fails at the operation 511 ("No" in operation 511), the processor 120 may display a message to retry a user input on the display (e.g., the display device 160 in FIG. 1). If the user authentication fails at the operation 511, the processor 120 may display a screen associated with another user authentication procedure (e.g., pattern, password) on the display 160.

At operation 513, the processor 120 may perform at least one particular function corresponding to the user input. According to an embodiment, the processor 120 may display information related to the at least one particular function on the display 160. For example, the processor 120 may display an execution screen of the at least one particular function on the display 160.

According to an embodiment, the electronic device 101 may set the execution of a Bixby program as the at least one particular function corresponding to the user input. For example, when a long input is detected through the input device, the processor 120 of the electronic device 101 may execute the Bixby program. If the Bixby program performs a function that requires user authentication, the processor 120 may activate the fingerprint sensor 401 substantially simultaneously while executing the Bixby program. According to an embodiment, in response to one user input, the electronic device 101 may simultaneously perform the execution of the Bixby program and the execution of the user authentication function through the activated fingerprint sensor 401. For example, when a short input is detected through the input device, the processor 120 may activate the display 160 and also maintain the fingerprint sensor 401 in the inactive state.

According to an embodiment, the electronic device 101 may change a particular function corresponding to a specific user input, based on user's setting. In addition, depending on the changed function, whether to activate the fingerprint sensor 401 may also be changed. For example, when the Bixby program is set, an operation of activating the fingerprint sensor 401 may be set together. Also, when the Bixby program setting is canceled, the activation operation of the fingerprint sensor 401 may be also canceled. For example, in response to a specific user input, the electronic device 101 may activate the fingerprint sensor 401 together while executing a specific program set in advance.

According to an embodiment, the electronic device 101 may receive a user's voice command through an audio module (e.g., the audio module 170 in FIG. 1), and execute the Bixby program in response to the voice command. If at least one particular function corresponding to the voice command is a function that requires user authentication, the electronic device 101 may switch the fingerprint sensor 401 from the inactive state to the active state.

According to various embodiments, in the folded state, the electronic device 101 may maintain the inactive state of the fingerprint sensor 401 to prevent malfunction of the fingerprint sensor. For example, the electronic device 101 may maintain the inactive state of the fingerprint sensor 401 in the folded state, and also maintain the active state of the fingerprint sensor 401 in the unfolded state. According to an embodiment, the electronic device 101 may detect a user input to at least one input device, and then switch the fingerprint sensor 401 being in the inactive state to the active state. In response to the user input, the electronic device 101 may identify at least one particular function corresponding to the user input, and determine whether the at least one particular function is a function that requires user authentication. If it is determined that the at least one particular function requires user authentication, the electronic device 101 may acquire fingerprint information corresponding to the user input through the activated fingerprint sensor 401, and then perform the at least one particular function based on the acquired fingerprint information.

According to various embodiments, in response to one user input, the electronic device 101 may activate the fingerprint sensor 401 and perform user authentication corresponding to the user input while performing at least one particular function corresponding to the user input. For example, in response to one user input, the electronic device 101 may perform an authentication function for a user and substantially simultaneously perform at least one particular function corresponding to the user input. As such, the electronic device 101 may perform a plurality of functions with one user input, so that user convenience may be improved. For example, through one touch input, the electronic device may not only perform a user authentication function, but also perform a particular function intended by the user. According to various embodiments, because whether or not to activate the fingerprint sensor is conditionally determined, a specific function that requires user authentication can be performed with one user input without additional input. For example, the execution time of a function requiring user authentication may be shortened, and user convenience may be improved.

Figure 6:
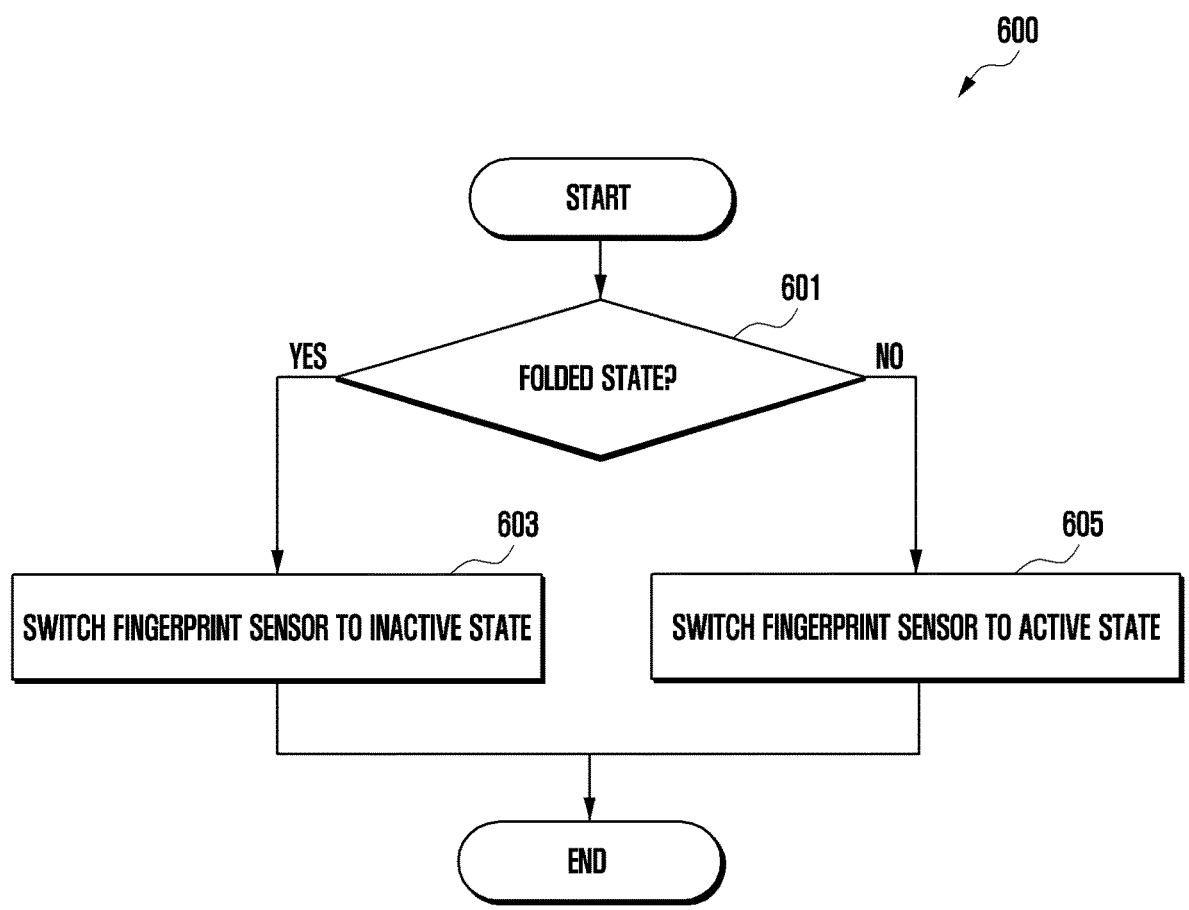
FIG. 6 is a flowchart illustrating an example method for determining activation or inactivation of a fingerprint sensor based on a folded state or an unfolded state of an electronic device according to various embodiments.

FIG. 6 is a flowchart 600 illustrating an example method for determining activation or inactivation of a fingerprint sensor based on a folded state or an unfolded state of an electronic device according to various embodiments.

Referring to FIG. 6, at least a part of an electronic device (e.g., the electronic device 101 in FIG. 1) may be bendable and may include a foldable housing. For example, the electronic device 101 may be in a folded state or an unfolded state, based on whether the foldable housing is bent or not. According to an embodiment, the electronic device 101 may be a rollable electronic device and may be placed in a rolled state or an unrolled state.

At operation 601, the electronic device 101 may determine whether the electronic device 101 is in the folded state. For example, the electronic device 101 may include a first housing (e.g., the first housing 210 in FIG. 2A) and a second housing (e.g., the second housing 220 in FIG. 2A), and in the folded state the first surface 211 of the first housing 210 and the third surface 221 of the second housing 220 may face each other. When the electronic device 101 is in the unfolded state, the first surface 211 of the first housing 210 and the third surface 221 of the second housing 220 may face the same direction (e.g., the first direction, the front direction, or the z-axis direction).

When it is determined at the operation 601 that the electronic device 101 is in the folded state ("Yes" in operation 601), a processor (e.g., the processor 120 in FIG. 1) may switch a fingerprint sensor (e.g., the fingerprint sensor 401 in FIG. 4) to the inactive state at operation 603. For example, the processor 120 may detect that the electronic device 101 is changed from the unfolded state to the folded state, and in response to this detection the processor 120 may switch the fingerprint sensor 401 from the active state to the inactive state.

When it is determined at the operation 601 that the electronic device 101 is not in the folded state (e.g., is in the unfolded state) ("No" in operation 601), the processor 120 may switch the fingerprint sensor 401 to the active state in operation 605. For example, the processor 120 may detect that the electronic device 101 is changed from the folded state to the unfolded state, and in response to this detection the processor 120 may switch the fingerprint sensor 401 from the inactive state to the active state.

According to an embodiment, the electronic device 101 may further include a sensor module (e.g., the sensor module 176 in FIG. 1) that detects an unfolded angle relying on a bent degree of the foldable housing. For example, the sensor module 176 may measure the unfolded angle between the first housing 210 and the second housing 220 with a hinge module (e.g., the hinge module 240 in FIG. 3A) as an axis.

According to an embodiment, the electronic device 101 may identify the unfolded angle using the sensor module 176. When the unfolded angle increases beyond a predetermined first threshold value, the processor 120 may determine that the electronic device 101 has switched from the folded state to the unfolded state. Then, the processor 120 may switch the fingerprint sensor 401 from the inactive state to the active state.

According to an embodiment, when the identified unfolded angle decreases below the first threshold value, the processor 120 may determine that the electronic device 101 has switched from the unfolded state to the folded state. Then, the processor 120 may switch the fingerprint sensor 401 from the active state to the inactive state.

According to an embodiment, at the operation 501 shown in FIG. 5, the electronic device 101 may be in the folded state, and the fingerprint sensor 401 may be in the inactive state.

According to an embodiment, the electronic device 101 may be a rollable electronic device or a slidable electronic device, which may be in a first state corresponding to the folded state or a second state corresponding to the unfolded state. For example, the first state may be a state in which the display is rolled and not exposed, and the second state may be a state in which the display is exposed to the outside. According to various embodiments, the electronic device 101 is not limited to a foldable electronic device, and may include any other electronic device capable of switching the fingerprint sensor between the active state and the inactive state in response to a change between the first state and the second state.

Figure 7:
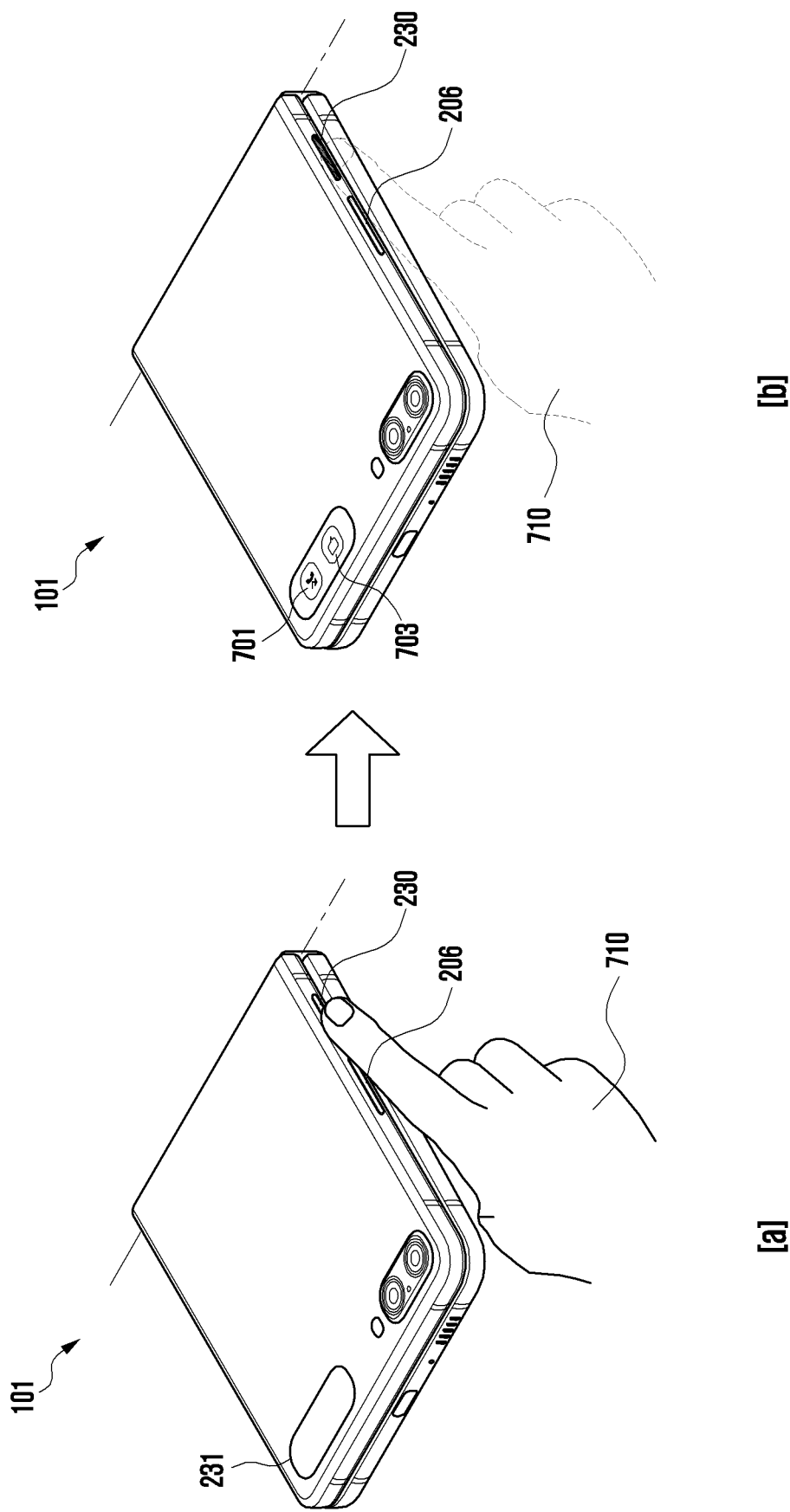
FIG. 7 is a diagram illustrating an example operation of activating a fingerprint sensor in response to a user input and acquiring fingerprint information corresponding to the user input in an electronic device according to various embodiments.

FIG. 7 is a diagram illustrating an example operation of activating a fingerprint sensor in response to a user input and acquiring fingerprint information corresponding to the user input in an electronic device according to various embodiments.

Referring to FIG. 7, an electronic device (e.g., the electronic device 101 in FIG. 1) is in a folded state, and a fingerprint sensor (e.g., the fingerprint sensor 401 in FIG. 4) disposed in an input device (e.g., the input device 150 in FIG. 1, the first key input device 230 in FIG. 2A) may maintain an inactive state.

In operation [a], the electronic device 101 being in the folded state may detect a user input 710 to the first key input device 230. For example, a processor (e.g., the processor 120 in FIG. 1) of the electronic device 101 may detect the user input 710 through the first key input device 230. The user input 710 may include a toggle input. According to an embodiment, the first key input device 230 may further include a pressure sensor, and the electronic device 101 may detect a pressure corresponding to the user input 710 through the pressure sensor, and compare the detected pressure with a predetermined reference value to determine whether the user input 710 has occurred. According to an embodiment, the user input 710 may include a short input of pressing the first key input device 230 once shortly, a long input of pressing the first key input device 230 for a certain time, and/or a double input of pressing the first key input device 230 twice in succession. In addition, the user input 710 may further include a combination of inputs using the first key input device 230 and the second key input device 206. According to an embodiment, the electronic device 101 may detect the user input 710 of various schemes. According to an embodiment, in response to the user input 710, the electronic device 101 may identify at least one particular function corresponding to the user input 710. For example, if the identified at least one particular function is a function requiring user authentication (e.g., a call transmission/reception function, a message transmission/reception function, a payment function, and/or a finance related function), the electronic device 101 may activate the fingerprint sensor 401 at least partially disposed in the first key input device 230. When the identified at least one particular function is a function that does not require user authentication, the electronic device 101 may maintain the fingerprint sensor 401 in the inactive state. As described above, because whether or not to activate the fingerprint sensor is conditionally determined, a specific function that requires user authentication using biometric information (e.g., fingerprint) can be performed with one user input without additional input in the folded state. Thus, the execution time of a function requiring user authentication may be shortened.

In operation [b], when the identified at least one particular function is a function requiring user authentication, the electronic device 101 may switch the fingerprint sensor 401 disposed at least partially in the first key input device 230 from the inactive state to the active state. Using the fingerprint sensor switched to the active state, the electronic device 101 may acquire user's fingerprint information from the user input 710. In operation [b], when user authentication is successful based on the user's fingerprint information, the electronic device 101 may display, on a sub-display (e.g., the sub-display 231 in FIG. 2A), one or more icons 701 and 703 for performing a particular function based on the user authentication. Then, the electronic device 101 may detect a user input corresponding to the icon 701 or 703 through the sub-display 231, and connect a phone call or transmit/receive a message in response to the user input.

According to various embodiments, in response to one user input, the electronic device 101 may perform a user authentication function based on the user input when at least one particular function to be performed is a function requiring user authentication, and substantially simultaneously perform the at least one particular function corresponding to the user input.

Figure 8:
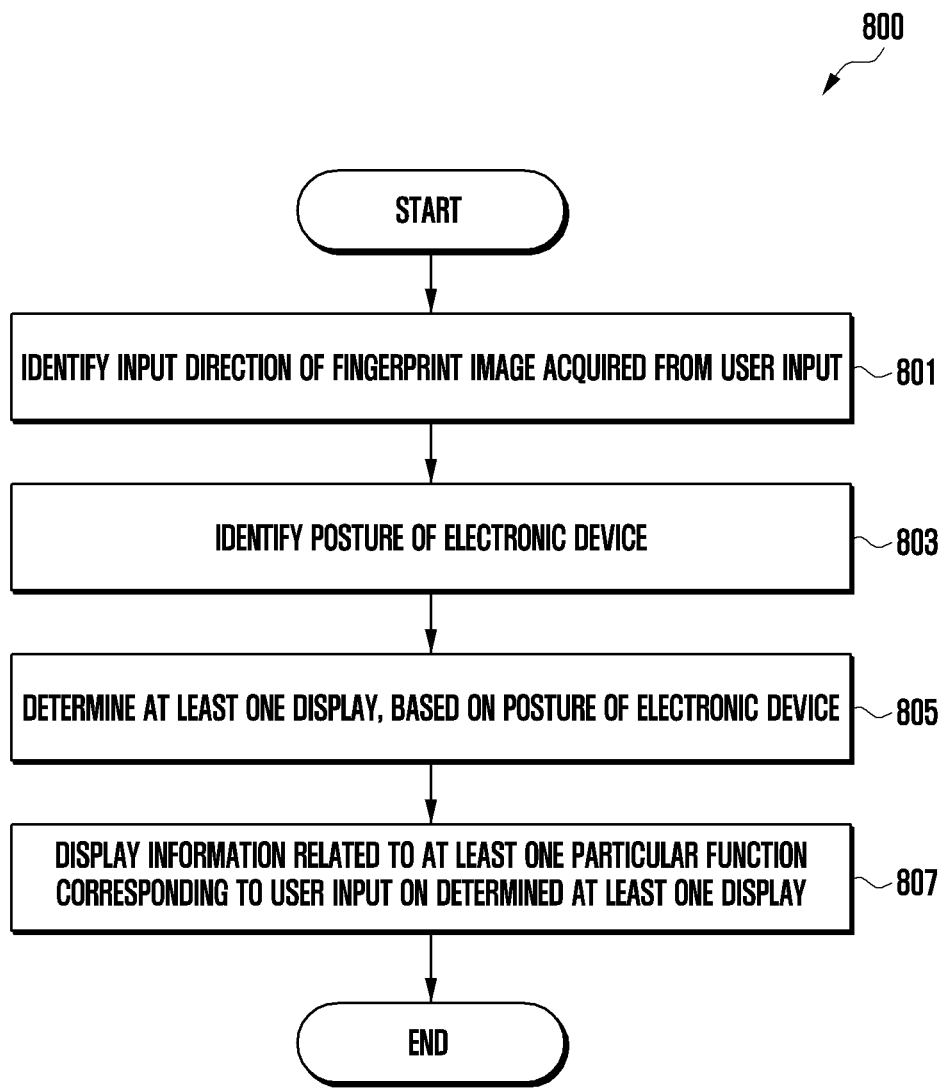
FIG. 8 is a flowchart illustrating an example method for determining at least one display for displaying information related to at least one particular function based on an input direction of a fingerprint image detected by a fingerprint sensor according to various embodiments.

FIG. 8 is a flowchart illustrating an example method for determining at least one display for displaying information related to at least one particular function based on an input direction of a fingerprint image detected by a fingerprint sensor according to various embodiments.

Referring to FIG. 8, an electronic device (e.g., the electronic device 101 in FIG. 1) may be in a folded state, an unfolded state, or an intermediate state. A fingerprint sensor (e.g., the fingerprint sensor 401 in FIG. 4) at least partially disposed in an input device (e.g., the input device 150 in FIG. 1) may be in an active state. When performing at least one particular function at the operation 513 shown in FIG. 5, the electronic device 101 may determine a display for displaying information related to the at least one particular function.

At operation 801, a processor (e.g., the processor 120 in FIG. 1) of the electronic device 101 may acquire a fingerprint image from a user input through the input device 150 in which the fingerprint sensor 401 is partially disposed. In addition, the processor 120 may identify an input direction of the acquired fingerprint image. For example, using the fingerprint sensor 401 based on a capacitive scheme, an optical scheme, or an ultrasonic scheme, the processor 120 may acquire a fingerprint image from a user input and identify an input direction of the acquired fingerprint image. For example, the processor 120 may compare a first fingerprint image acquired through the fingerprint sensor 401 with a second fingerprint image stored in a memory (e.g., the memory 130 in FIG. 1), and thereby determine an input direction of the first fingerprint image.

At operation 803, the processor 120 may identify a posture of the electronic device 101, based on the input direction of the fingerprint image. For example, the processor 120 may identify a current state (e.g., a folded state, an unfolded state, or an intermediate state) of the electronic device 101, and based on the current state, determine whether the electronic device 101 is mounted. According to an embodiment, using a sensor module (e.g., the sensor module 176 in FIG. 1) such as a gyro sensor (e.g., the gyro sensor 403 in FIG. 4) and/or an acceleration sensor (e.g., the acceleration sensor 405 in FIG. 4), the processor 120 may identify the posture of the electronic device 101. According to an embodiment, the electronic device 101 may include a first housing (e.g., the first housing 210 in FIG. 2A) and a second housing (e.g., the second housing 220 in FIG. 2A), and a main PCB and a sub-PCB may be disposed in the first housing 210 and the second housing 220, respectively. According to an embodiment, at least one of the gyro sensor 403 and the acceleration sensor 405 may be disposed in each of the first housing 210 and the second housing 220. According to an embodiment, the processor 120 may measure a plurality of sensing values using a plurality of sensors disposed in the first housing 210 and the second housing 220, and identify the posture of the electronic device 101 corresponding to the measured sensing values. According to an embodiment, a hinge module (e.g., the hinge module 240 in FIG. 3A) of the electronic device 101 may include a sensor (e.g., a digital hall IC) for correcting an angle value depending on the posture of the electronic device 101. Using this sensor (e.g., the digital hall IC), the processor 120 may correct a sensing value corresponding to the posture and angle of the electronic device 101.

According to an embodiment, using the gyro sensor or the acceleration sensor, the processor 120 may determine whether the electronic device 101 is exposed in a first direction (e.g., a front direction or the z-axis direction), that is, whether at least one display (e.g., a front display) disposed in the first direction is exposed. In addition, using the gyro sensor or the acceleration sensor, the processor 120 may determine whether the electronic device 101 is exposed in a second direction (e.g., a rear direction or the negative z-axis direction) opposite to the first direction, that is, whether at least one display (e.g., a rear display) disposed in the second direction is exposed. According to an embodiment, the processor 120 may use a camera module (e.g., the camera module 180 in FIG. 1) to detect a direction in which a user gazes, and based on the user's gaze direction, identify the posture of the electronic device 101.

According to an embodiment, the electronic device 101 may identify its posture, based on at least one of the input direction of the fingerprint image, the sensing value(s) of the gyro sensor 403 and/or the acceleration sensor 405, and/or the user's gaze direction detected through the camera module 180.

At operation 805, the processor 120 may determine at least one display (e.g., the flexible display 400 in FIG. 2A, the sub-display 231 in FIG. 3A, and/or another display 232 in FIG. 3D), based on the posture of the electronic device 101. For example, the at least one display may be switched to an active state to display information related to at least one particular function corresponding to a user input. According to an embodiment, the processor 120 may predict at least one display corresponding to a user's gaze direction, and determine the predicted at least one display.

At operation 807, the processor 120 may display information related to the at least one particular function corresponding to the user input on the determined at least one display. For example, the processor 120 may execute the at least one particular function and display an execution screen of the at least one particular function.

According to an embodiment, the electronic device 101 may identify its posture, based on at least one of the input direction of the fingerprint image, the sensing value(s) of the gyro sensor 403 and/or the acceleration sensor 405, and/or the user's gaze direction detected through the camera module 180. Based on the identified posture, the electronic device 101 may predict and determine the at least one display corresponding to the user's gaze direction. The electronic device 101 may display information related to the at least one particular function corresponding to the user input through the determined at least one display.

Figure 9:
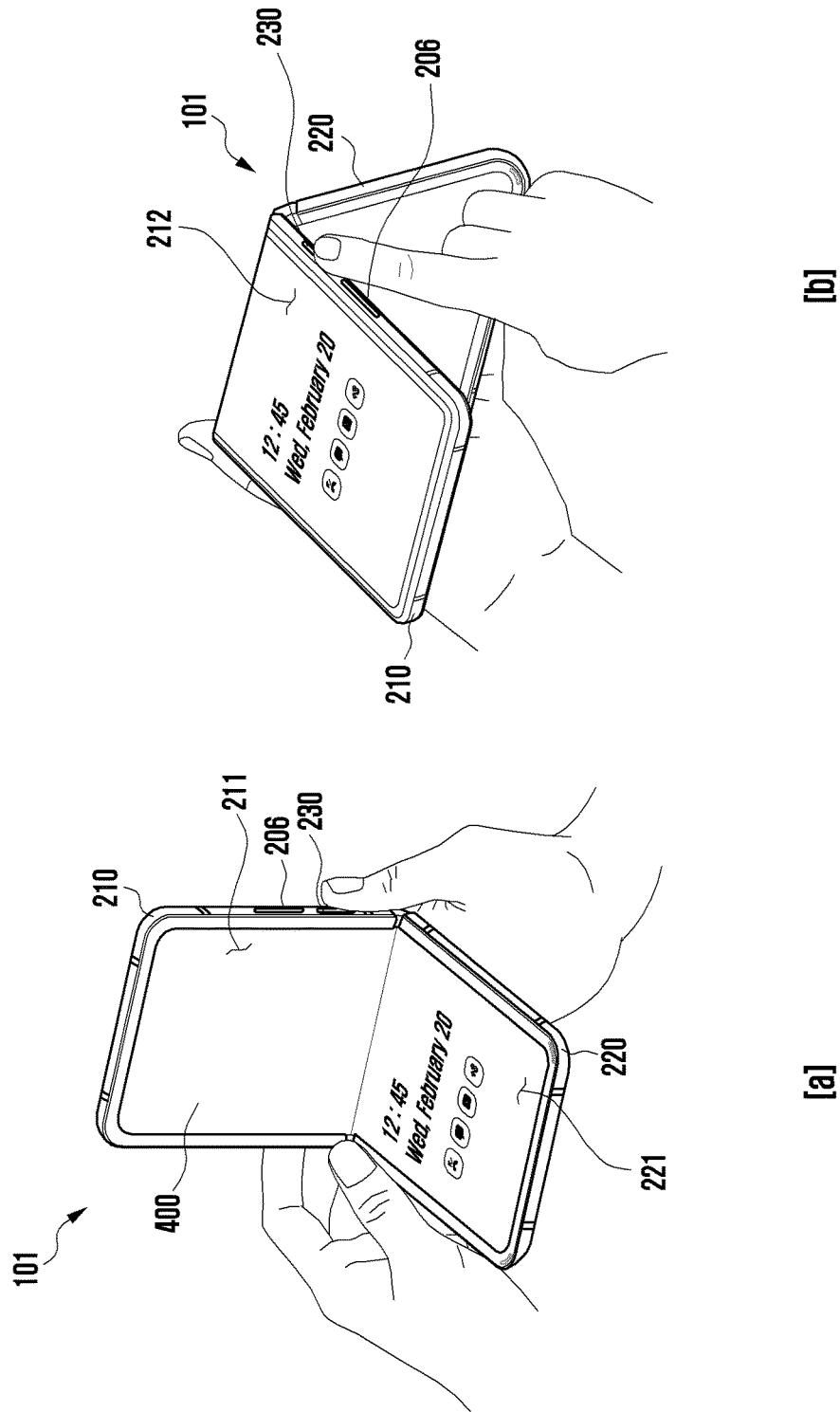
FIG. 9 is a diagram illustrating an example operation of activating at least one display based on an input direction of a fingerprint image detected by a fingerprint sensor according to various embodiments.

FIG. 9 is a diagram illustrating an example operation of activating at least one display based on an input direction of a fingerprint image detected by a fingerprint sensor according to various embodiments.

Referring to FIG. 9, an electronic device (e.g., the electronic device 101 in FIG. 1) may be in the intermediate state in which a foldable housing is bent at least in part.

Referring to operations [a] and [b], the electronic device 101 being in the intermediate state may identify an input direction of a fingerprint image corresponding to a user input through a first key input device (e.g., the first key input device 230 in FIG. 2A). The electronic device 101 may identify its posture, based on the input direction of the fingerprint image, and determine at least one display, based on the identified posture. For example, the electronic device 101 may determine the at least one display for displaying information related to at least one particular function corresponding to the user input. According to an embodiment, the electronic device 101 may measure its tilted value using a gyro sensor (e.g., the gyro sensor 403 in FIG. 4) and/or an acceleration sensor (e.g., the acceleration sensor 405 in FIG. 4), and identify its posture using the measured value. For example, at least one of the gyro sensor 403 and the acceleration sensor 405 may be disposed in each of a first housing (e.g., the first housing 210 in FIG. 2A) and a second housing (e.g., the second housing 220 in FIG. 2A) of the electronic device 101. The electronic device 101 may identify its posture using such sensor(s) disposed in each of the first housing 210 and the second housing 220. According to an embodiment, the electronic device 101 may use a camera module (e.g., the camera module 180 in FIG. 1) to identify a user's gaze direction and determine its posture based on the identified gaze direction.

In operation [a], the electronic device 101 may inactivate a display in an area corresponding to a first surface (e.g., the first surface 211 in FIG. 2A) of the first housing 210, and also activate a display in an area corresponding to a third surface (e.g., the third surface 221 in FIG. 2A) of the second housing 220. For example, a flexible display (e.g., the flexible display 400 in FIG. 2A) may be disposed to extend from the first surface 211 of the first housing 210 to at least a part of the third surface 221 of the second housing 220 across a hinge module (e.g., the hinge module 240 in FIG. 3A). The flexible display 400 may be divided into a first display area corresponding to the first surface 211 and a second display area corresponding to the third surface 221, and each of the first and second display areas may be in an active state or an in inactive state independently. In operation [a], the electronic device 101 may identify a user's gaze direction, based on the identified posture, and separately switch the second display area corresponding to the gaze direction to the active state. Then, the electronic device 101 may display, on the activated second display area, information related to at least one particular function corresponding to a user input.

In operation [b], the electronic device 101 may activate a display (e.g., a third display area) in an area corresponding to the second surface (e.g., the second surface 212 in FIG. 3A) of the first housing 210. For example, the display (e.g., the third display area) in the area corresponding to the second surface may be included in the sub-display of the electronic device 101. In operation [b], the electronic device 101 may identify the user's gaze direction, based on the identified posture, and separately switch the third display area corresponding to the gaze direction to the active state. Then, the electronic device 101 may display, on the activated third display area, information related to at least one particular function corresponding to a user input.

According to various example embodiments, a method of an electronic device 101 at least a part of which is bendable may include: detecting a user input through at least one input device 150 in which a fingerprint sensor 401 being in an inactive state is disposed, identifying at least one particular function corresponding to the detected user input in response to the user input, activating the fingerprint sensor 401 based on the identified at least one particular function being a function requiring user authentication, performing user authentication corresponding to the user input using the activated fingerprint sensor 401, and performing the at least one particular function corresponding to the user input upon successful user authentication.

According to an example embodiment, the electronic device 101 may further include a foldable housing including a hinge (e.g., the hinge module 240 in FIG. 3A), a first housing (e.g., the first housing structure 210 in FIG. 2A) connected to the hinge 240 and including a first surface (e.g., the first surface 211 in FIG. 2A) facing a first direction and a second surface (e.g., the second surface 212 in FIG. 3A) facing a second direction opposite the first direction, and a second housing (e.g., the second housing structure 220 in FIG. 2A) connected to the hinge 240, including a third surface (e.g., the third surface 221 in FIG. 2A) facing a third direction and a fourth surface (e.g., the fourth surface 222 in FIG. 3B) facing a fourth direction opposite the third direction, the second housing being foldable to face the first housing 210 around the hinge 240. The first surface 211 may face the third surface 221 in a folded state, and the third direction may be a same direction as the first direction in an unfolded state.

According to an example embodiment, the method may further include identifying an unfolded angle of the foldable housing using a sensor module 176 configured to detect the unfolded angle of the foldable housing, and switching the fingerprint sensor 401 from the inactive state to an active state based on the unfolded angle exceeding a predetermined threshold.

According to an example embodiment, the method may further include identifying an input direction of a fingerprint image detected by the fingerprint sensor 401, identifying a posture of the electronic device 101 based on the input direction of the fingerprint image, determining at least one display 160 disposed on the foldable housing based on the posture of the electronic device 101, and activating the determined at least one display 160.

According to an example embodiment, the method may further include identifying the posture of the electronic device 101 using a gyro sensor 403 and an acceleration sensor 405, determining the at least one display 160 based on the input direction of the fingerprint image and the posture of the electronic device 101, and activating the determined at least one display 160.

According to an example embodiment, the posture of the electronic device 101 may be identified by comparing a first fingerprint image stored in the memory 130 and a second fingerprint image detected by the fingerprint sensor 401.

According to an example embodiment, the function requiring user authentication may include a function performed using user's personal information stored in the memory 130, and include at least one of a message transmission/reception function, a call transmission/reception function, and a payment-related function.

According to an example embodiment, based on activating the fingerprint sensor 401, an active state of the fingerprint sensor 401 may be maintained for a predetermined time.

According to an example embodiment, the fingerprint sensor 401 may be disposed in the at least one input device 150 and acquire fingerprint information corresponding to the user input, based on a capacitive scheme, an optical scheme, or an ultrasonic scheme.

An electronic device according to an embodiment may be one of various types of electronic devices. The electronic device may include a portable communication device (e.g., a smart phone), a computer device, a portable multimedia device, a portable medical device, a camera, a wearable device, a home appliance, or the like. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

The term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents.

What is claimed is:

1. An electronic device, at least a part of which is bendable, comprising:
   at least one input device including a fingerprint sensor disposed therein;
   a memory; and
   a processor operatively connected to the at least one input device and the memory,
   wherein the processor is configured to:
   detect a user input through the at least one input device based on the fingerprint sensor being in an inactive state,
   identify at least one particular function corresponding to the detected user input in response to the detected user input,
   determine whether the at least one particular function requires user authentication,
   in a case in which the at least one particular function requires user authentication, initiate executing the at least one particular function in parallel with activating the fingerprint sensor,
   perform user authentication corresponding to the user input using the activated fingerprint sensor,
   control the electronic device to perform the at least one particular function corresponding to the user input upon successful user authentication, and
   in a case in which the at least one particular function requires no user authentication, control the electronic device to perform the at least one particular function corresponding to the user input without activating the fingerprint sensor.

2. The electronic device of claim 1, further comprising:
   a foldable housing including:
   a hinge;
   a first housing connected to the hinge and including a first surface facing a first direction and a second surface facing a second direction opposite the first direction; and
   a second housing connected to the hinge, including a third surface facing a third direction and a fourth surface facing a fourth direction opposite the third direction, the second housing being foldable about the hinge to face the first housing,
   wherein the first surface faces the third surface in a folded state, and the third direction is a same direction as the first direction in an unfolded state.

3. The electronic device of claim 2, further comprising:
   a sensor module comprising at least one sensor configured to detect an unfolded angle of the foldable housing,
   wherein the processor is configured to:
   identify the unfolded angle of the foldable housing through the sensor module, and
   switch the fingerprint sensor from the inactive state to an active state based on the unfolded angle exceeding a predetermined threshold.

4. The electronic device of claim 2, further comprising:
   at least one display disposed on the foldable housing,
   wherein the processor is configured to:
   identify an input direction of a fingerprint image detected by the fingerprint sensor,
   identify a posture of the electronic device based on the input direction of the fingerprint image,
   determine the at least one display based on the posture of the electronic device, and
   activate the determined at least one display.

5. The electronic device of claim 4, further comprising:
   a gyro sensor and an acceleration sensor configured to identify the posture of the electronic device,
   wherein the processor is configured to:
   identify the posture of the electronic device using the gyro sensor and the acceleration sensor,
   determine the at least one display based on the input direction of the fingerprint image and the posture of the electronic device, and
   activate the determined at least one display.

6. The electronic device of claim 5, wherein the processor is configured to:
   identify the posture of the electronic device by comparing a first fingerprint image stored in the memory and a second fingerprint image detected by the fingerprint sensor,
   determine the at least one display to be activated based on the identified posture, and
   activate the determined at least one display.

7. The electronic device of claim 1, wherein the function requiring user authentication includes a function performed using user's personal information stored in the memory, and includes at least one of a message transmission/reception function, a call transmission/reception function, and a payment-related function.

8. The electronic device of claim 1, wherein based on activating the fingerprint sensor, the processor is configured to maintain an active state of the fingerprint sensor for a predetermined time.

9. The electronic device of claim 1, wherein the fingerprint sensor is disposed in the at least one input device and is configured to acquire fingerprint information corresponding to the user input based on a capacitive scheme, an optical scheme, or an ultrasonic scheme.

10. The electronic device of claim 9, wherein based on first fingerprint information acquired using the fingerprint sensor and second fingerprint information stored in the memory being identical to each other, the processor is configured to determine that user authentication is successful.

11. The electronic device of claim 1, wherein the memory stores the at least one particular function to be performed in response to the user input.

12. The electronic device of claim 2, wherein the user input is detected through the at least one input device based on the electronic device being in the folded state.

13. A method of operating an electronic device at least a part of which is bendable, the method comprising:
    detecting a user input through at least one input device in which a fingerprint sensor being in an inactive state is disposed;
    identifying at least one particular function corresponding to the detected user input;
    determining whether the at least one particular function requires user authentication;
    in a case in which the at least one particular function requires user authentication, initiating executing the at least one particular function in parallel with activating the fingerprint sensor;
    performing user authentication corresponding to the user input using the activated fingerprint sensor;
    performing the at least one particular function corresponding to the user input upon successful user authentication; and
    in a case in which the at least one particular function requires no user authentication, controlling the electronic device to perform the at least one particular function corresponding to the user input without activating the fingerprint sensor.

14. The method of claim 13, wherein the electronic device comprises a foldable housing including:
a hinge;
a first housing connected to the hinge and including a first surface facing a first direction and a second surface facing a second direction opposite the first direction; and
a second housing connected to the hinge, including a third surface facing a third direction and a fourth surface facing a fourth direction opposite the third direction, the second housing being foldable about the hinge to face the first housing,
wherein the first surface faces the third surface in a folded state, and the third direction is a same direction as the first direction in an unfolded state.

15. The method of claim 14, further comprising:
identifying an unfolded angle of the foldable housing using a sensor module configured to detect the unfolded angle of the foldable housing; and
switching the fingerprint sensor from the inactive state to an active state based on the unfolded angle exceeding a predetermined threshold.

16. The method of claim 14, further comprising:
identifying an input direction of a fingerprint image detected by the fingerprint sensor;
identifying a posture of the electronic device based on the input direction of the fingerprint image;
determining at least one display disposed on the foldable housing based on the posture of the electronic device; and
activating the determined at least one display.

17. The method of claim 16, further comprising:
identifying the posture of the electronic device using a gyro sensor and an acceleration sensor;
determining the at least one display based on the input direction of the fingerprint image and the posture of the electronic device; and
activating the determined at least one display.

18. The method of claim 17, wherein the posture of the electronic device is identified by comparing a first fingerprint image stored in memory of the electronic device and a second fingerprint image detected by the fingerprint sensor.

19. The method of claim 13, wherein the function requiring user authentication includes a function performed using user's personal information stored in memory of the electronic device, and includes at least one of a message transmission/reception function, a call transmission/reception function, and a payment-related function.

20. The method of claim 13, wherein based on activating the fingerprint sensor, an active state of the fingerprint sensor is maintained for a predetermined time.

21. The method of claim 13, wherein the fingerprint sensor is disposed in the at least one input device and is configured to acquire fingerprint information corresponding to the user input based on a capacitive scheme, an optical scheme, or an ultrasonic scheme.

* * * * *